(12) United States Patent
Vartia et al.

(10) Patent No.: US 12,440,614 B2
(45) Date of Patent: Oct. 14, 2025

(54) SYSTEM AND METHOD FOR PRODUCING FLUID FOR PERITONEAL DIALYSIS

(71) Applicant: Gambro Lundia AB, Lund (SE)

(72) Inventors: Christian Vartia, Veberod (SE); Henrik Lindgren, Genarp (SE); Per-Olof Borgqvist, Lund (SE); Olof Jansson, Vellinge (SE)

(73) Assignee: GAMBRO LUNDIA AB, Lund (SE)

( * ) Notice: Subject to any disclaimer, the term of this patent is extended or adjusted under 35 U.S.C. 154(b) by 692 days.

(21) Appl. No.: 17/798,114

(22) PCT Filed: Feb. 5, 2021

(86) PCT No.: PCT/EP2021/052784
§ 371 (c)(1),
(2) Date: Aug. 8, 2022

(87) PCT Pub. No.: WO2021/156429
PCT Pub. Date: Aug. 12, 2021

(65) Prior Publication Data
US 2023/0069896 A1 Mar. 9, 2023

(30) Foreign Application Priority Data
Feb. 6, 2020 (SE) .................... 2050127-6

(51) Int. Cl.
*A61M 1/28* (2006.01)
*A61M 1/16* (2006.01)
*B01D 61/00* (2006.01)

(52) U.S. Cl.
CPC .......... *A61M 1/287* (2013.01); *A61M 1/1672* (2014.02); *A61M 1/284* (2014.02); *B01D 61/002* (2013.01)

(58) Field of Classification Search
None
See application file for complete search history.

(56) References Cited

U.S. PATENT DOCUMENTS

| 10,293,094 B2 | 5/2019 | Spanget et al. |
| 2017/0065762 A1 | 3/2017 | Larsen et al. |

(Continued)

FOREIGN PATENT DOCUMENTS

| JP | 6575249 B2 | 4/2016 |
| WO | 2004008826 | 1/2004 |
| WO | 2009083011 | 7/2009 |

OTHER PUBLICATIONS

"Dialysis Fluid Regeneration by Forward Osmosis: A Feasible Option for Ambulatory Dialysis Systems," Saudi J. Kidney Dis Transpl 2010; 21 (4):748-749 2010—Saudi Center for Organ Transplantation; Saudi Journal of Kidney Diseases and Transplantation.

(Continued)

*Primary Examiner* — Krishnan S Menon
(74) *Attorney, Agent, or Firm* — K&L Gates LLP

(57) ABSTRACT

A system for producing fluid for peritoneal dialysis (PD) is disclosed. The system includes a fluid path including two or more PD concentrate connectors that are each connected to a source of PD concentrate fluid, and an inlet connector connected to a fluid line arranged for transportation of effluent fluid from a patient. The system also includes a forward osmosis (FO)-unit including a draw side and a feed side separated by a FO-membrane. The FO-unit is fluidly connected to the fluid path and receives one or more PD concentrate fluids at the draw side and the effluent at the feed side. Water is transported from the effluent to the one or more PD concentrate fluids through the FO-membrane via an osmotic pressure gradient between the draw side and the feed side, thereby diluting the one or more PD concentrate fluids into a diluted PD concentrate fluid.

20 Claims, 6 Drawing Sheets

(56) References Cited

U.S. PATENT DOCUMENTS

| | | |
|---|---|---|
| 2018/0021501 A1 | 1/2018 | Gerber et al. |
| 2019/0184344 A1 | 6/2019 | Mentzel et al. |
| 2023/0103623 A1* | 4/2023 | Marterstock .......... A61M 1/154 204/535 |

OTHER PUBLICATIONS

International Search Report—PCT/EP2021/052787 mailed May 6, 2021—3 pages.
Written Opinion—PCT/EP2021/052787 mailed May 6, 2021—11 pages.
Swedish Search Report—Application No. 2050127-6—date of mailing Sep. 10, 2020.

* cited by examiner

SYSTEM AND METHOD FOR PRODUCING FLUID FOR PERITONEAL DIALYSIS

PRIORITY CLAIM

This application is a national phase entry of PCT/EP2021/052784, filed Feb. 5, 2021, which claims priority to Swedish Patent Application No. 2050127-6, filed Feb. 6, 2020, the entire disclosures of which are incorporated by reference herein.

TECHNICAL FIELD

The present invention relates to the field of peritoneal dialysis, and to systems and methods for producing fluid to be used in peritoneal dialysis treatments.

BACKGROUND

Peritoneal dialysis (PD) is a method for treating patients suffering from renal failure. During PD, the peritoneal cavity of a patient is filled with fresh PD fluid, and waste and fluid is transported from the blood of the patient, via the patient's peritoneal membrane, to the fresh PD fluid. The used PD fluid is thereafter drained from the patient. There are several kinds of PD. In automated peritoneal dialysis (APD) a machine or cycler is used to fill the peritoneal cavity with fresh PD fluid, and after a specified dwell period, automatically drains the used PD solution from the body. This procedure is repeated several times, typically during overnight.

In continuous flow peritoneal dialysis (CFPD) the machine is used to provide a continuous flow of fresh PD fluid to the peritoneal cavity of the patient, and a continuous flow of used PD fluid from the patient. APD systems on the market today use centrally manufactured PD fluids that are shipped to the patient ready to use in bags that are stored in the patient's home.

Transportation of PD fluids adds treatment cost and has a negative impact on the environment. The storage of PD fluids in the patient's home is space demanding. Patient handling of the PD fluids prior to the treatment adds to the patient burden, wherein many patients find it heavy to place the PD fluid bags in correct position before the start of treatment. There is accordingly a need to reduce the negative consequences listed above.

SUMMARY

It is an objective of the disclosure to alleviate at least some of the drawbacks with the prior art. It is a further objective to provide a cost-efficient solution for producing fluid for PD at the point of care. It is a still further objective to provide a solution for producing fluid for PD at the point of care, which consumes low amounts of water.

These objectives and others are at least partially achieved by the system and method according to the independent claims, and by the embodiments according to the dependent claims.

According to one aspect of the present disclosure, which may be combined with any other aspect or portion thereof, the disclosure relates to a system for producing fluid for peritoneal dialysis (PD). The system comprises a fluid path having one or more PD concentrate connectors each configured to be connected to a source of PD concentrate fluid, and an inlet connector configured to be connected to a fluid line arranged for transportation of effluent fluid from a patient. The system further comprises a forward osmosis (FO-) unit including a draw side and a feed side separated by a FO-membrane. The FO-unit is fluidly connected to the fluid path. The FO-unit is configured to receive the one or more PD concentrate fluids at the draw side and to receive the effluent at the feed side, wherein water from the effluent is transported to the one or more PD concentrate fluids through the FO-membrane by means of an osmotic pressure gradient between the draw side and the feed side. The one or more PD concentrate fluids are thereby diluted into a diluted PD concentrate fluid. The system further includes a concentration sensor configured to sense the concentration of the diluted PD concentrate fluid or a weigh scale to sense the weight of the diluted PD concentrate fluid. The system further comprises a control arrangement configured to control a flow rate of effluent fluid into the feed side, control a flow rate of the one or more PD concentrate fluids into the draw side based on (i) the sensed concentration by the concentration sensor or (ii) the sensed weight by the weigh scale to yield the diluted PD concentrate fluid, and control a flow rate of a second or third concentrate into the diluted PD concentrate fluid to form a final PD fluid.

The proposed system can reuse water from the effluent and thereby decrease the novel pure water demand. In comparison to local manufacturing of PD fluid using tap water purification, the purification unit may be made less complex and costly since its capacity could be reduced. In comparison to central manufacturing and shipping of the entire fluid volume, the fluid volume to ship could be reduced.

According to another aspect of the present disclosure, which may be combined with any other aspect or portion thereof, the system comprises a concentration sensor configured to sense the concentration of the diluted PD concentrate fluid. The control arrangement is configured to control the flow rate of the one or more PD concentrate fluids into the draw side based on the sensed concentration of the diluted PD concentrate fluid.

According to another aspect of the present disclosure, which may be combined with any other aspect or portion thereof, the control arrangement is configured to control the flow rate of effluent fluid into the feed side and to control the flow rate of the one or more PD concentrate fluids into the draw side to a flow rate that matches a certain production rate of the final PD fluid to achieve a prescribed concentration of the one or more PD concentrate fluids in the final PD fluid.

According to another aspect of the present disclosure, which may be combined with any other aspect or portion thereof, the control arrangement comprises a first pump configured to control the flow rate of the one or more PD concentrate fluids into the draw side.

According to another aspect of the present disclosure, which may be combined with any other aspect or portion thereof, (i) controlling the flow rate of effluent fluid into the feed side, and (ii) controlling the flow rate of the one or more PD concentrate fluids to yield the diluted PD concentrate fluid is performed prior to treatment.

According to another aspect of the present disclosure, which may be combined with any other aspect or portion thereof, the control arrangement is configured such that transportation of effluent fluid from a patient for storage is performed prior to treatment.

According to another aspect of the present disclosure, which may be combined with any other aspect or portion thereof, the fluid path comprises an osmotic agent connector configured to be connected to a source of osmotic agent. The control arrangement is configured to supply osmotic agent from the source of osmotic agent to the fluid path to achieve a prescribed concentration of the osmotic agent in the final PD fluid.

According to another aspect of the present disclosure, which may be combined with any other aspect or portion thereof, the system comprises another pump configured to control a flow rate of the osmotic agent from the source of osmotic agent to the fluid path.

According to another aspect of the present disclosure, which may be combined with any other aspect or portion thereof, the fluid path comprises a water source connector located downstream from the FO-osmosis unit, wherein the water source is configured to be connected to a source of pure water. The control arrangement is configured to supply pure water from the source of pure water to the diluted PD concentrate fluid to achieve a prescribed composition of the final PD fluid.

According to another aspect of the present disclosure, which may be combined with any other aspect or portion thereof, the system is configured to sense a concentration of the final PD fluid. The control arrangement is configured to control the flow rate of the diluted one or more PD concentrate fluids to achieve a prescribed composition of the final PD fluid based on the sensed concentration of the final PD fluid.

According to another aspect of the present disclosure, which may be combined with any other aspect or portion thereof, the system comprises a system pump configured to control a flow rate of the final PD fluid.

According to another aspect of the present disclosure, which may be combined with any other aspect or portion thereof, the system comprises a container fluidly connected or connectable to the fluid path, wherein the container is arranged to receive the diluted PD concentrate fluid.

According to another aspect of the present disclosure, which may be combined with any other aspect or portion thereof, the system comprises an effluent pump arranged to control the flow rate of effluent fluid into the feed side of the FO-unit.

According to another aspect of the present disclosure, which may be combined with any other aspect or portion thereof, the system comprises a heater configured to heat the fluid in the fluid path.

According to another aspect of the present disclosure, which may be combined with any other aspect or portion thereof, the system comprises an effluent container fluidly connected to the fluid path and the inlet connector, wherein the effluent container is arranged to collect effluent fluid received from the patient before it is transported into the feed side of the FO-unit.

According to another aspect of the present disclosure, which may be combined with any other aspect or portion thereof, the fluid path comprises a circulation fluid path, and wherein the control arrangement is configured to circulate the diluted PD concentrate fluid in the circulation fluid path until a mixing criterion for the diluted PD concentrate fluid is fulfilled.

According to another aspect of the present disclosure, which may be combined with any other aspect or portion thereof, one of the one or more PD concentrate sources comprises a fluid, comprising one or more of lactate, acetate, citrate, bicarbonate, KCl, MgCl2, CaCl2 and NaCl.

According to another aspect of the present disclosure, which may be combined with any other aspect or portion thereof, one of the PD concentrate fluids includes a higher concentrated component solution (e.g., NaCl) than the component solution in a fully mixed version of the PD concentrate, and the other of the PD concentrate fluids includes a remainder of the concentrate.

According to another aspect of the present disclosure, which may be combined with any other aspect or portion thereof, the weigh scale is configured to operate with the diluted PD concentrate container, and which includes a second weigh scale configured to operate with the one or more PD concentrate fluids.

According to another aspect of the present disclosure, which may be combined with any other aspect or portion thereof, the system is a continuous flow peritoneal dialysis (CFPD) system, and which includes a drain pump positioned and arranged to pump effluent from a patient to a location for delivery to the feed side of the FO-unit.

According to another aspect of the present disclosure, which may be combined with any other aspect or portion thereof, the control arrangement includes the first pump configured to pump diluted one or more PD concentrate fluids from the diluted PD concentrate container and a second PD concentrate pump configured to pump the one or more PD concentrate fluids into the draw side of the FO-unit.

According to another aspect of the present disclosure, which may be combined with any other aspect or portion thereof, the system includes a line and valve positioned and arranged to enable initially but not completely diluted PD concentrate fluid to be redirected for delivery to the feed side of the FO-unit.

According to another aspect of the present disclosure, which may be combined with any other aspect or portion thereof, the system includes a device configured and arranged to create a higher pressure on the feed side of the FO-unit than the draw side.

According to a further aspect of the present disclosure, which may be combined with any other aspect or portion thereof, the disclosure comprises a method for producing fluid for peritoneal dialysis (PD) in a system comprising a forward osmosis-(FO-) unit. The FO-unit comprises a draw side and a feed side separated by a FO-membrane, the FO-unit is configured to receive one or more PD concentrate fluids at the draw side and effluent fluid from a PD patient at the feed side to transport water from the effluent to the one or more PD concentrate fluids through the FO-membrane by means of an osmotic pressure gradient between the draw side and the feed side and thereby dilute the one or more PD concentrate fluids into a diluted PD concentrate fluid. The method includes controlling a flow rate of the effluent fluid into the feed side of the FO-unit, and controlling a flow rate of the one or more PD concentrate fluids into the draw side based on a sensed concentration by a concentration sensor or weight by a weigh scale to yield the diluted PD concentrate fluid. The method further includes controlling a flow rate of a second concentrate into the diluted PD concentrate fluid to form a final PD fluid.

According to another aspect of the present disclosure, which may be combined with any other aspect or portion thereof, the method comprises controlling the flow rate of the effluent and the flow rate of the one or more PD concentrate fluids prior to treatment and controlling the flow rate of the second or third concentrate is performed during treatment.

According to another aspect of the present disclosure, which may be combined with any other aspect or portion thereof, the method comprises controlling a flow rate of the effluent fluid into the feed side of the FO-unit; and controlling a flow rate of the one or more PD concentrate fluids into the draw side, to a flow rate that matches a certain production rate of a final PD fluid to achieve a prescribed concentration of the one or more PD concentrate fluids in the final PD fluid.

According to another aspect of the present disclosure, which may be combined with any other aspect or portion thereof, the method comprises sensing the concentration of the diluted PD concentrate fluid and controlling the flow rate of the one or more PD concentrate fluids into the draw side based on the sensed concentration of the diluted PD concentrate fluid.

According to another aspect of the present disclosure, which may be combined with any other aspect or portion thereof, the method comprises controlling the flow rate of the one or more PD concentrate fluids into the draw side using a first pump.

According to another aspect of the present disclosure, which may be combined with any other aspect or portion thereof, the method comprises supplying an osmotic agent from a source of osmotic agent to the fluid path to achieve a prescribed concentration of the osmotic agent in the final PD fluid.

According to another aspect of the present disclosure, which may be combined with any other aspect or portion thereof, the supplying comprises controlling a flow rate of the osmotic agent from the source of osmotic agent to the fluid path with another pump.

According to another aspect of the present disclosure, which may be combined with any other aspect or portion thereof, the method comprises supplying pure water from a source of pure water located downstream the FO-osmosis unit to the diluted PD concentrate fluid to achieve a prescribed composition of the final PD fluid.

According to another aspect of the present disclosure, which may be combined with any other aspect or portion thereof, the method comprises sensing a concentration of the final PD fluid, and controlling the flow rate of the one or more PD concentrate fluids into the draw side to achieve a prescribed composition of the final PD fluid, which is based on the sensed concentration.

According to another aspect of the present disclosure, which may be combined with any other aspect or portion thereof, the method comprises controlling the flow rate of the final PD fluid with a system pump.

According to another aspect of the present disclosure, which may be combined with any other aspect or portion thereof, the method comprises directing the diluted PD concentrate fluid into a container.

According to another aspect of the present disclosure, which may be combined with any other aspect or portion thereof, the method comprises controlling the flow rate of effluent fluid into the feed side using an effluent pump.

According to another aspect of the present disclosure, which may be combined with any other aspect or portion thereof, the method comprises heating the fluid in the fluid path with a heater.

According to another aspect of the present disclosure, which may be combined with any other aspect or portion thereof, the method comprises collecting the effluent fluid in an effluent container before it is transported into the feed side of the FO-unit.

According to another aspect of the present disclosure, which may be combined with any other aspect or portion thereof, the method comprises circulating the diluted PD concentrate fluid in a circulation fluid path until a mixing criterion for the diluted PD concentrate fluid is fulfilled.

According to yet a further aspect of the present disclosure, which may be combined with any other aspect or portion thereof, the disclosure relates to a computer program comprising instructions that cause the system according to the first aspect to execute the steps of the method according to the second aspect.

According to still a further aspect of the present disclosure, which may be combined with any other aspect or portion thereof, the disclosure relates to a computer-readable memory having stored thereon the computer program of the third aspect.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

In the following disclosure, several embodiments of systems and methods for producing fluids for treating peritoneal dialysis ("PD") will be described. The embodiments may each make use of forward osmosis (FO) to dilute one or more PD concentrates using water transported over a FO-membrane from used PD fluid or "effluent". Water from the effluent is reused for mixing with PD concentrates to provide new PD fluid. The solution may be used for different variants of automated PD, including on-line mixing of PD fluid and batch-wise mixing of PD fluid. Performance tests of the system have indicated that it is possible to reduce novel pure water demand by 50-70% or higher compared to a system not using the present structure and methodology.

A plurality of systems for producing fluids for PD are described herein, with reference to FIGS. 1, 3, 4, 5, 6 and 7. References that are the same throughout the figures may not be textually described in each embodiment but include all of the structure, functionality and alternatives that are described.

Figure 1:
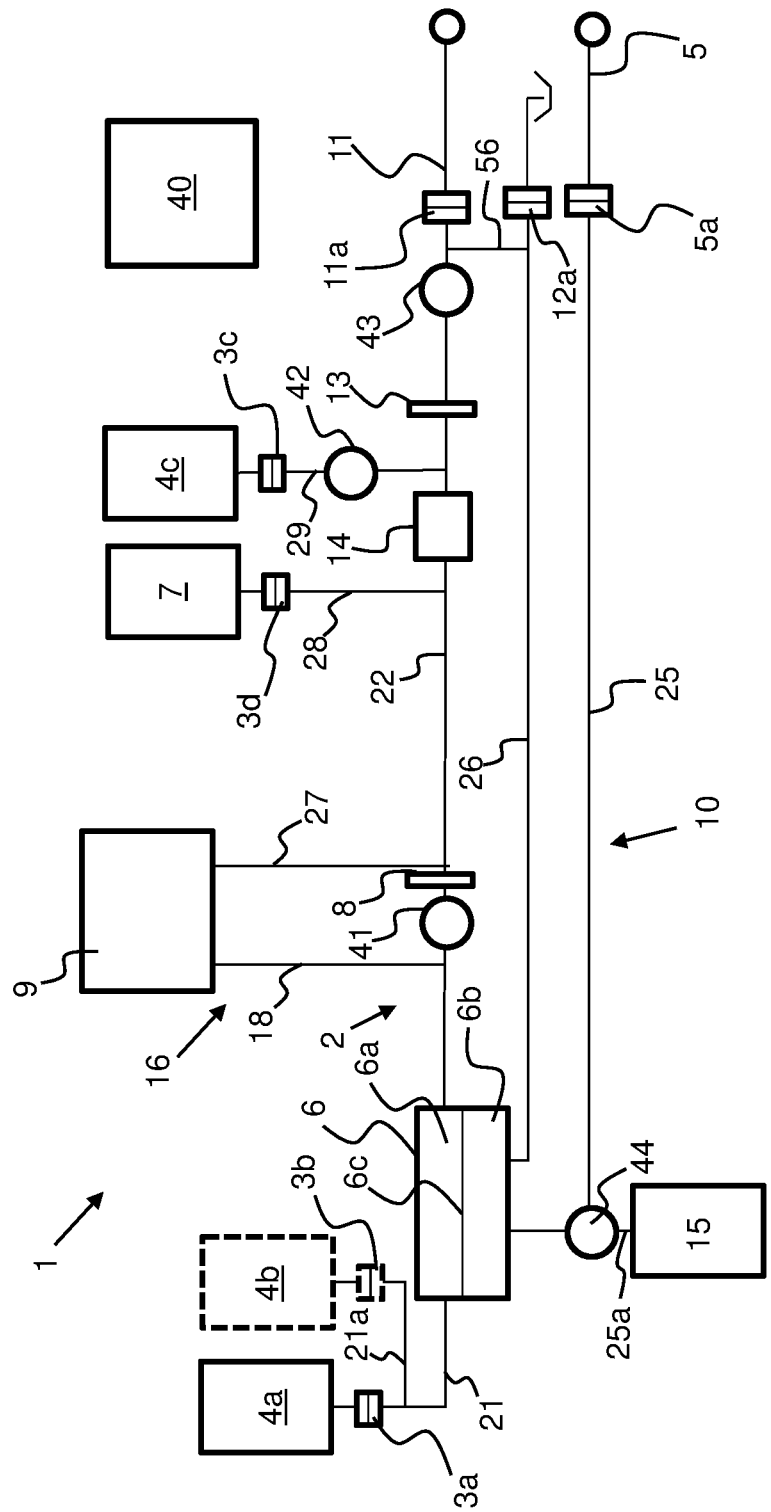
FIGS. 1, 3, 4, 5, 6 and 7 illustrate different embodiments for a system for producing fluid for PD according to some embodiments.

FIG. 1 illustrates a system 1 according to some embodiments of the disclosure. The system 1 includes a fluid path 2, a plurality of connectors, a forward osmosis-(FO-) unit 6 and a control arrangement 10. The fluid path 2 may be enclosed inside an enclosure (not shown in FIG. 1). The fluid path 2 may be part of an apparatus or a disposable system. The fluid path 2 includes a plurality of fluid lines. The fluid path 2 may include some or all of the fluid lines as described herein. The connectors include one or more PD concentrate connectors 3a, 3b, 3c. Each PD concentrate connector is configured to be connected to a source of PD concentrate fluid 4a, 4b, 4c. PD concentrate fluid 4b is illustrated in FIG. 1 dashed line, as being optional, and representing that more than one draw side concentrate may be provided. As described herein, then, PD concentrate fluid 4a may be considered a first concentrate fluid, PD concentrate fluid 4b if provided may be considered a second concentrate fluid, while PD concentrate fluid 4c may be considered a second or third concentrate fluid depending on whether PD concentrate fluid 4b is provided or not. A source of PD concentrate fluid is typically a bag with PD concentrate. Each PD concentrate connector is then configured to be connected to a corresponding connector provided with the PD concentrate fluid bag. The connectors also include an inlet connector 5a. The inlet connector 5a is typically configured to be connected to a fluid line 5 arranged for transportation of effluent fluid from a patient.

The FO-unit 6 comprises a draw side 6a and a feed side 6b separated with a FO-membrane 6c. The FO-unit 6 is fluidly connected to the fluid path 2. The FO-unit 6 is configured to receive the one or more PD concentrate fluids 4a, 4b at the draw side 6a and to receive the effluent at the feed side 6b to transport water from the effluent to the one or more PD concentrate fluids through the FO-membrane 6c by means of an osmotic pressure gradient between the draw side 6a and the feed side 6b. The one or more PD concentrate fluids are therefore diluted into a diluted PD concentrate fluid. The FO-membrane 6c is a water permeable membrane. The FO-membrane 6c typically has a pore-size in the nanometer (nm) range, for example from 0.5 to 5 nm or less depending on the solutes that are intended to be blocked. It separates the effluent (feed side) and the PD concentrate (draw side). The different sides may also be referred to as compartments. The fluids in these sides typically flow in countercurrent flow, but may alternatively flow in co-current flows. In some embodiments, the fluids flow single pass, wherein the fluid passes through the FO-unit 6 only once. Suitable FO-units for FO-unit 6 may be provided by Aquaporin™, AsahiKASEI™, Berghof™, CSM™, FTSH$_2$O™, Koch Membrane Systems™, Porifera™, Toyobo™ and Toray™.

The water in the effluent is transported over the FO-membrane by means of the driving force created by the osmotic pressure gradient between the effluent (feed solution) and the one or more PD concentrate fluids (draw solution). This means that the effluent, which initially has about the same osmolarity as final PD fluid, will become more concentrated throughout the FO process. The one or more PD concentrates will on the other hand be more diluted throughout the FO process.

The FO-membrane is a water treatment membrane capable of facilitating the forward osmosis process. It is a semipermeable membrane that allows a flow of water from the low concentrate side (feed side) to the high concentrate side (draw side). The FO-membrane typically comprises a thin rejection layer (or active layer) and an underlying porous support. Again, the FO-membrane may have a pore-size in the nanometer (nm) range, for example from 0.5 to 5 nm or less depending on the solutes that are intended to be blocked. The FO-membrane 6c is typically designed to be more or less exclusively selective towards water molecules, which enables the membrane to separate water from all other contaminants. The geometry of the membrane may be flat-sheet, tubular or hollow fiber.

In more detail, a first PD concentrate bag 4a is connected via a first bag connector to a first PD concentrate connector 3a. A first fluid line 21 is fluidly connected between the first PD concentrate connector 3a and an inlet port of the draw side 6a. The first fluid line 21 thus connects the first PD concentrate connector 3a and the draw side 6a. An optional additional PD concentrate bag 4b is connected via an optional bag connector to an additional PD concentrate connector 3b. A fluid line 21a may be fluidly connected between the additional PD concentrate connector 3b and the first fluid line 21. The fluid line 21a thus connects the additional PD concentrate connector 3b and the first fluid line 21. It should be understood that the flows through the first fluid line 21 and the fluid line 21a may be controlled by means of one or more valves and/or one or more pumps arranged to the first fluid line 21 and the fluid line 21a. These components are not shown in FIG. 1 for ease of illustration.

A second fluid line 22 is fluidly connected between an outlet of the draw side 6a and an outlet connector 11a. The second fluid line 22 thus fluidly connects the draw side 6a and the outlet connector 11a. The outlet connector 11a is configured to be connected to a corresponding connector of a fluid line 11, which is configured to transport final PD fluid directly to a catheter of patient, to a cycler for pumping the fluid to a patient, or to a batch container. A third fluid line 25 is connected between the inlet connector 5a and an inlet of the feed side 6b. The third fluid line 25 thus fluidly connects the inlet connector 5a and the feed side 6b. The effluent may optionally be collected in an effluent container 15 before the effluent is fed into the feed side 6b. Thus, the effluent container 15 may be arranged to collect effluent fluid received from the patient before it is transported into the feed side 6b. A fluid line 25a then connects the effluent container 15 to the third fluid line 25. Thus, the effluent container 15 is fluidly connected to the fluid path 2 and the inlet connector 5a.

An effluent pump 44 is arranged in FIG. 1 to control the flow rate of effluent fluid into the feed side 6b. The effluent pump 44 is also arranged to control the flow rate of effluent to the effluent container 15. Further, the effluent pump 44 is arranged to control the flow rate of effluent from the effluent container 15 into the feed side 6b. Here, the effluent pump 44 is arranged to control the flow rate of effluent fluid in the third fluid line 25. A fourth fluid line 26 is connected between an outlet of the feed side 6b to a drain connector 12a. Thus, the fourth fluid line 26 connects the feed side 6b and the drain connector 12a. The drain connector 12a is configured to be connected to a corresponding connector of a drain line (not shown), which may be connected to a drain to remove the effluent after use. A connection fluid line 56 may be connected between the second fluid line 22 and the fourth fluid line 26. Connection fluid line 56 is for example used during draining of fluid during flushing, cleaning or as overflow to drain, and may be controlled via valves (not shown).

The system 1 further comprises a container 9 fluidly connected or connectable to the fluid path 2. The container 9 is arranged to receive the diluted PD concentrate fluid. A fifth fluid line 18 is connected between a first port 9a (FIGS. 3 and 4) of the container 9 and the second fluid line 22. The fifth fluid line 18 thus connects the first port 9a of the container 9 and the second fluid line 22. A sixth fluid line 27 is connected between a second port 9b (FIGS. 3 and 4) of the container 9 and the second fluid line 22. The sixth fluid line 27 thus connects the second port 9b of the container 9 and the second fluid line 22. The fifth fluid line 18 connects to the second fluid line 22 at a first point of the second fluid line 22. The sixth fluid line 22 connects to the second fluid line 22 at a second point of the second fluid line 22. A first pump 41 is arranged to pump fluid in the second fluid line 22. The first pump 41 is arranged in FIG. 1 between the first point and the second point of the second fluid line 22. The first pump 41 is also configured to control the flow rate of the one or more PD concentrate fluids into the draw side 6a.

A first concentration (e.g., conductivity) sensor 8 is arranged to sense a concentration of the fluid in the second fluid line 22 between the first point and the second point of the second fluid line 22. The fluid path 2 includes a circulation fluid path 16, which includes the container 9, the fifth fluid line 18, the sixth fluid line 27, and the second fluid line 22 from the first point to the second point. The fluid path 2 further comprises a water source connector 3d configured to be connected to a source of pure water 7. An eighth fluid line 28 is connected between the water source connector 3d and the second fluid line 22. The eighth fluid line 28 thus fluidly connects the water source connector 3d and the second fluid line 22. The fluid path 2 also comprises an osmotic agent connector 3c configured to be connected to a source of osmotic agent 4c. A ninth fluid line 29 is connected between the osmotic agent connector 3c and the second fluid line 22. The ninth fluid line 29 thus fluidly connects the osmotic agent connector 3c and the second fluid line 22.

A second pump 42 is configured to control a flow rate of the osmotic agent from the source of osmotic agent 4c to the fluid path 2. The second pump 42 is configured to control the flow rate of the osmotic agent in the ninth fluid line 29. A heater 14 is configured to heat the fluid in the fluid path 2. The heater 14 is in FIG. 1 configured to heat the fluid in the second fluid line 22 downstream the water source 7, but upstream the osmotic agent source 4c. Alternatively, the heater 14 may be arranged to heat the fluid at any other place along the second fluid line 22. A system pump 43 is configured to control a flow rate of the final PD fluid in the second fluid line 22. A second concentration sensor 13 is configured to sense the concentration of the final PD fluid in the second fluid line 22.

A concentration sensor may include for example a conductivity sensor configured to sense the conductivity of a fluid, or a resistivity sensor configured to sense the resistivity of a fluid. Even if, e.g., a resistivity sensor is used, the sensed value may be translated into a conductivity value, if desired. Conductivity values may likewise be converted into resistivity values.

The system 1 further comprises a control arrangement 10 configured to control a flow rate of effluent fluid into the feed side 6b. Effluent fluid control is for example made by means of the effluent pump 44. In some embodiments, the control arrangement 10 is further configured to control a flow rate of the one or more PD concentrate fluids into the draw side 6a to a flow rate that matches a certain production rate of a final PD fluid with a prescribed concentration of the one or more PD concentrate fluids. The final PD fluid has a composition of PD concentrates and water that is prescribed or predetermined beforehand. It is thus also known, that is prescribed, which concentration of the one or more PD concentrates the final PD fluid should have. The final PD fluid is PD fluid that is ready to be delivered to the peritoneal cavity of a patient. The production rate may be batch-wise, that is, a certain or prescribed volume of final PD fluid is produced. The certain volume constitutes a batch. Alternatively, the production mode includes a continuous or continual flow rate of final PD fluid.

The control arrangement 10 is configured to add correct amounts of the one or more PD concentrates to the fluid path 2, to achieve a prescribed final composition of the final PD fluid. During the forward osmosis process in the FO-unit 6, water from the effluent is transported over to the one or more PD concentrates. The one or more PD concentrates then becomes diluted into a diluted PD concentrate in the FO-unit 6 and is outputted as diluted PD concentrate fluid from the FO-unit 6 into the second fluid line 22. The control arrangement 10 is configured to control the flow rate of the one or more PD concentrate fluids into the draw side 6a based on the sensed concentration of the diluted PD concentrate fluid.

It is desired to withdraw as much water as needed from the effluent to produce final PD fluid. In order to achieve such withdrawal in some embodiments, the flow rate of the effluent into the feed side 6b is matched with the flow rate of the one or more PD concentrates into the draw side 6b. The flow rates are initially set to approximate flow rates based on the desired composition of the PD fluid, the concentration of the PD concentrate and the amount of effluent at hand and the time available for the FO session. The amount of PD concentrates in the desired composition PD fluid is known or predetermined beforehand, as well as the concentration of the PD concentrate(s). Thus, for each batch of final PD fluid, the amount of PD concentrate(s) to be supplied into the draw side 6a is known. The amount of effluent is also known from how much effluent the effluent pump 44 has been pumping into the effluent bag 15, or from weighting the effluent bag 15. For example, if 100 ml of PD concentrate is included in the batch of final PD fluid, then 100 ml will be supplied from the PD concentrate source 4a and pumped into the FO-unit 6 by means of the first pump 41. During the same time period, as the PD concentrate is pumped into the FO-unit 6 (draw side 6a), the effluent is pumped from the effluent source 15 into the FO-unit (feed side 6b). The amount of effluent is typically larger than the amount of PD concentrate, for example 2000 ml compared to the 100 ml PD concentrate. The effluent is then pumped into the feed side 6b with a flow rate that is 20 times larger than flow rate of the (one or more) PD concentrate into the draw side 6a.

In some embodiments, the diluted PD concentrate is directed to the container 9. By changing the speed of the first pump 41, the flow rate of the one or more PD concentrate fluids into the draw side 6a can be changed such that a desired product of concentration and volume of the diluted PD concentrate fluid can be achieved. This desired product of concentration and volume is thus the desired amount of PD concentrate that shall be included in a batch. The concentration sensor 8 is configured to sense the concentration of the diluted PD concentrate. The sensed concentration, together with the flow rate provided with the first pump 41, may be used to calculate an amount of PD concentrate pumped to the container 9. The sensed concentration may also be used for control of the flow rate of the one or more PD concentrates into the draw side 6a with the first pump 41. It can then be assured that the correct amount of the one or more PD concentrates is supplied for the desired production rate. Alternatively, the control arrangement 10 comprises a pump (not shown) operable with the first fluid line 21 to pump the one or more concentrates into the draw side 6b. The pump can then directly control the flow rate of the one or more PD concentrate fluids into the draw side 6a. The pump may then pump the PD concentrates into the draw side 6b with a flow rate that is set to achieve the desired product of concentration and volume of the diluted PD concentrate fluid. The diluted PD concentrate is thereafter pumped into the container 9 by means the first pump 41 and collected into the container 9. The control arrangement 10, typically using valves (not shown in FIG. 1), directs the diluted PD concentrate into the container 9.

The control arrangement 10 is thereafter configured to circulate the diluted PD concentrate fluid in the circulation fluid path 16 until a mixing criterion for the diluted PD concentrate fluid is fulfilled. The mixing criterion may include for example that the sensed concentration has a value within a predetermined interval for a predetermined time. After a batch of diluted PD concentrate has been collected in the container 9, the diluted PD concentrate solution may thereafter by dispensed from the container 9 by means of the first pump 41 with a flow rate that matches or corresponds to a production rate of the final PD fluid. The production rate in turn may correspond to a production of a certain batch (volume) of PD fluid over a certain time. Thus, the diluted PD concentrate solution is pumped with the first pump 41 to have a flow rate $V_{P1}$ in ml/min in the second fluid line 22 towards the system pump 43. The system pump 43 is typically configured to pump with a constant flow rate $V_{sp}$ ml/min, determined using the desired production rate. The control arrangement 10 is further configured to supply pure water from the source of pure water 7 to the diluted PD concentrate fluid to achieve a prescribed composition of the final PD fluid.

In one embodiment, the one or more PD concentrates introduced into the draw side 6a may include both an osmotic agent fluid, and a buffer concentrate fluid, which has a different composition than the osmotic agent fluid. The osmotic agent is for example glucose. The water supplied to the second fluid path 22 from the water source 7 will then have a flow rate of $V_{sp}$ minus $V_{P1}$. Thus, the diluted PD concentrate fluid is further diluted by the water to produce the final PD fluid. Alternatively, only one PD concentrate is introduced into the draw side 6a, typically a buffer concentrate, while the osmotic agent fluid is introduced downstream the FO-unit 6, via the ninth fluid line 29. The second pump 42 pumps the osmotic agent into the second fluid line 22 with a fluid rate $V_{P2}$ ml/min. The control arrangement 10 is configured to supply osmotic agent from the source of osmotic agent 4c to the fluid path 2 to achieve a prescribed concentration of the osmotic agent 4c in the final PD fluid. The water supplied to the second fluid path 22 from the water source 7 will then have a flow rate of $V_{sp}$ minus $V_{P1}$ minus $V_{P2}$. Thus, the diluted PD concentrate fluid is further diluted by the water, after which the osmotic agent is added to the solution and the final PD fluid is produced. The flow rate $V_{P1}$ of the diluted PD concentrate may depend on the concentration of the diluted PD concentrate solution and the desired composition of the final PD fluid.

Typically, the higher the concentration of the diluted PD concentrate, the lower the flow rate $V_{P1}$ of the first pump 41, such that more water will be supplied to the diluted PD concentrate for further dilution. Thus, by varying the flow rate $V_{P1}$ the amount of water added from the water source 7 is varied.

One of the one or more PD concentrate sources 4a comprises a fluid including one or more of ions and/or salts, such as, lactate, acetate, citrate, bicarbonate, KCl, MgCl2, CaCl2, NaCl. For example, the one PD concentrate source may include a fluid containing buffer agents, e.g., one or more of lactate, citrate, acetate and bicarbonate. This fluid, when eventually diluted with water and possibly other PD concentrates becomes the final PD fluid which has a pH applicable for PD treatments, and one or more of KCl, MgCl2, CaCl2 and NaCl. Final PD fluids may be formed having standard glucose levels, such as 1.36% or 2.27% glucose.

The system 1 is further configured to sense a concentration of the final PD fluid with the second concentration sensor 13. The control arrangement 10 is configured to control the flow rate of the diluted one or more PD concentrate fluids to achieve a prescribed composition of the final PD fluid based on the sensed concentration of the final PD fluid. Thus, the sensed concentration may be used to fine-tune the flow rate of the first pump 41, to achieve the final composition, and thus a final concentration for the final PD fluid. Alternatively, the flow rate delivered with the second pump 42 may be fine-adjusted to achieve the final composition, and thus a final concentration for the final PD fluid. The control arrangement 10 also comprises a control unit 40 including a processor and a memory. The memory typically stores a program that when executed by the processor controls the system 1 as described herein. The control unit 40 may also comprise a communication interface enabling the control unit 40 to communicate data and signals to and from the components of the system 1, for example, send control signals to valves and pumps, and receive sensed data from concentration sensors and feedback signals from the valves and pumps.

The valves described are typically on/off valves. The valves may be two-way or three-way valves.

Figure 2:
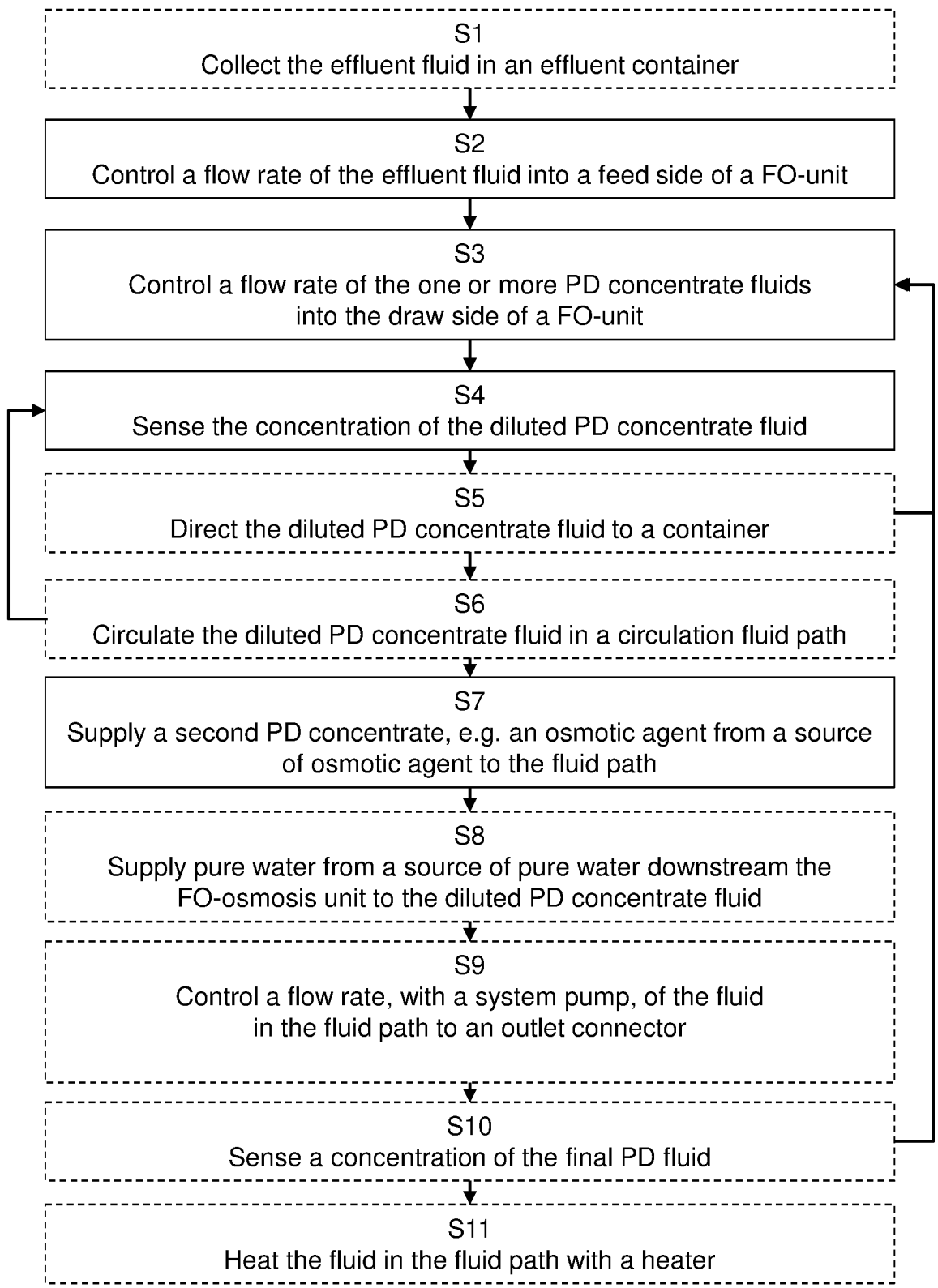
FIG. 2 is a flowchart of a method for producing fluid for PD according to some embodiments.

FIG. 2 is a flow chart of a method according to some embodiments of the disclosure. The method may be implemented as instructions of a computer program and saved in the memory of the control unit 40. The method is explained together with the flow chart of FIG. 2.

The flow chart discloses a method for producing fluid for peritoneal dialysis (PD) in a system comprising a forward osmosis-(FO-) unit 6. The system may be any one of the systems 10 as illustrated herein. The boxes illustrated in dashed line correspond to alternative or optional functions or procedures. In the illustrated embodiment, the method at S1 collects the effluent fluid in an effluent container 15 before it is transported into the feed side 6b. Alternatively, the effluent has already been collected into the container 15. In another alternative, the effluent is provided continuously on-line to the system 10 from the patient via an effluent line 5. The method at S2 further comprises controlling a flow rate of the effluent fluid into the feed side 6b of the FO-unit 6. The controlling at S2 includes controlling the flow rate of effluent fluid into the feed side 6b using an effluent pump 44. The speed of the effluent pump is typically configured to provide a predetermined flow rate of effluent into the feed side 6b.

The method at S3 further comprises controlling a flow rate of the one or more PD concentrate fluids 4a, 4b into the draw side 6a, to achieve a flow rate that matches a certain production rate of a final PD fluid with a prescribed concentration of the one or more PD concentrate fluids. Thus, a diluted PD concentrate is obtained such that when water (and sometimes osmotic agent) is thereafter added downstream to the diluted PD concentrate, a final PD fluid with a prescribed composition is obtained. The controlling at S3 may include controlling the flow rate of the one or more PD concentrate fluids into the draw side 6a using a first pump 41.

The method at S4 may further include sensing the concentration of the diluted PD concentrate fluid and controlling the flow rate of the one or more PD concentrate fluids into the draw side 6a by means of the first pump 41. The method may include sensing the concentration with the first concentration sensor 8 and controlling the speed of the first pump 41, such that the diluted PD concentrate has a desired product of concentration and volume.

The method at S5 may thereafter include directing the diluted PD concentrate fluid to a container 9. The diluted PD concentrate may then be collected in the container 9 until a predetermined amount of the one or more PD concentrates have been pumped into the draw side 6a. The method at S6 includes circulating the diluted PD concentrate fluid in a circulation fluid path 16 until a mixing criterion for the diluted PD concentrate fluid is fulfilled. When a batch of final PD fluid is to be produced, the diluted PD fluid is then pumped with the first pump 41 into the second fluid line 22 and towards the system pump 43. Alternatively, the diluted PD concentrate fluid is not directed to the container 9, and is instead directed to continue to flow in the second fluid line 22, whereby the final PD fluid may be provided in a continuous flow.

The method at S7 may comprise supplying a PD concentrate from a source 4c, such as an osmotic agent from a source of osmotic agent 4c into the fluid path 2 to achieve a prescribed concentration of the osmotic agent 4c in the final PD fluid. The osmotic agent may be added upstream the FO-unit 6 as one of the one or more PD concentrate fluids. Alternatively, the osmotic agent is supplied downstream the FO-unit 6 into the diluted PD concentrate fluid. The supplying of osmotic agent at S7 may then comprise controlling a flow rate of the osmotic agent from the source of osmotic agent 4c to the fluid path 2 with a second pump 42. To produce a final PD fluid, water is added to the fluid that is being mixed. The method at S8 comprises supplying pure water from a source of pure water 7 downstream of the FO-osmosis unit 6 to the diluted PD concentrate fluid to achieve a prescribed composition of the final PD fluid.

To produce a final PD fluid, the method at S9 includes controlling the flow rate of the final PD fluid with a system pump 43. In some embodiments, the method at S10 senses the concentration of the final PD fluid with a second concentration sensor 13 and at S3 controls the flow rate of the one or more PD concentrate fluids into the draw side 6a to achieve a prescribed composition of the final PD fluid, based on the sensed concentration. The sensed composition, and thus concentration, is fine-tuned to a prescribed composition.

To provide a final PD fluid that can be directly introduced into the peritoneal cavity of a patient, the method at S11 includes heating the fluid in the fluid path 2 with a heater 14. The heater 14 may also be used for disinfecting the fluid path 2 of the system 1.

Figures 3, 4:
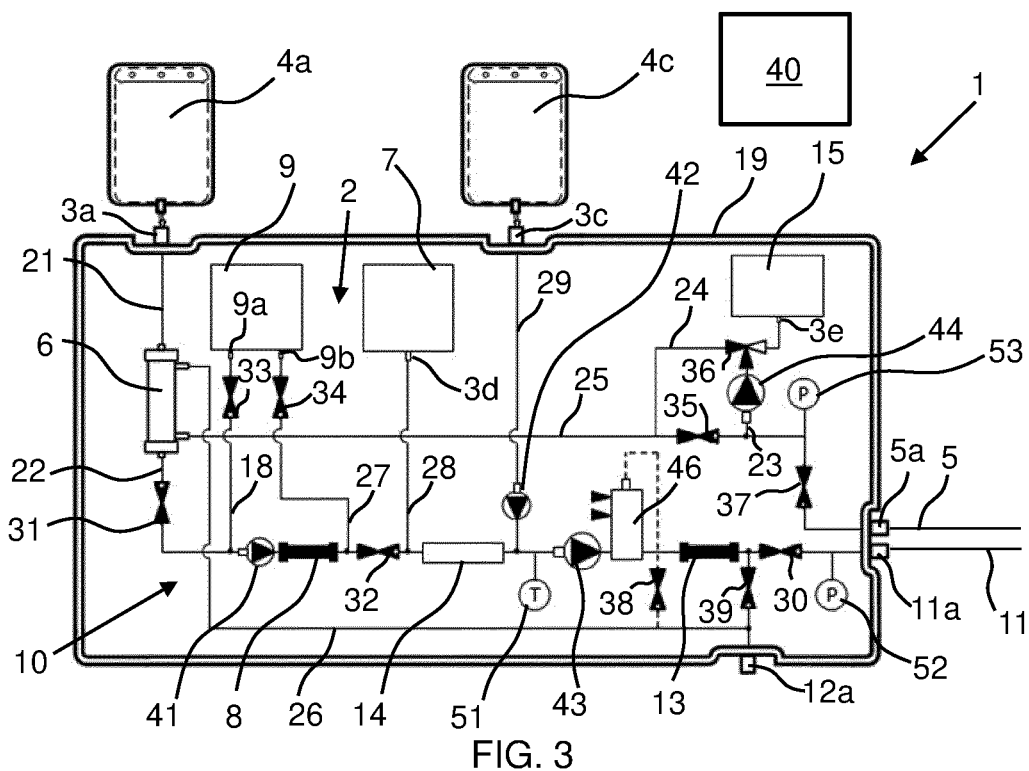

Alternative APD systems 1 employing FO water reuse from the effluent, each under control of control unit 40, are illustrated and described in connection with FIGS. 3 and 4. FIG. 3 illustrates system 1 having on-line PD fluid production. System 1 in FIG. 3 may be modified to perform continuous flow peritoneal dialysis (CFPD), wherein PD fluid flow to the patient may be continuous or intermittent, but where dedicated dwell periods are not provided and the effluent is reused. FIG. 4 illustrates system 1 having batch-wise PD fluid production.

System 1 in each of FIGS. 1, 3 and 4 use a buffer solution as a draw solution. The buffer solution is used as a draw solution in one embodiment since its concentration when diluted is easily detected based on conductivity. This principle may be used in all of the following embodiments of systems 1 since the dilution ratio of the buffer solution after FO session will be unknown. If the glucose concentrate were to be used as draw solution, it's dilution ratio after the FO session would be unknown, wherein the system would either have to rely on glucose's relatively weak effect on conductivity or on a glucose concentration measurement (e.g., via refractometer) during dosing to the mixing system. Another advantage of using buffer solution as a draw solution is that is has about twice the osmolarity of the glucose concentrate and hence causes twice as high osmotic pressure during the FO session. Different constitutions of buffer solutions may be used in the different versions of system 1 described herein (e.g., different nominal dilution ratios, buffer systems, etc.).

System 1 in FIG. 3 is explained together with a proposed sequence for producing fluid for PD, including diluted concentrate fluid and final PD fluid. The system 1 in FIG. 3 has the same reference numbers for the same parts as described in connection with the system in FIG. 1. FIG. 3 further illustrates a plurality of valves. Such valves include: a first valve 32 operable with the second fluid line 22 downstream of the second point of the second fluid line 22; a second valve 31 operable with the second fluid line 22 upstream of the first point of the second fluid line 22; a third valve 33 operable with the fifth fluid line 18; a fourth valve 34 operable with the sixth fluid line 27; a fifth valve 35 operable with the third fluid line 25 upstream of the inlet to the feed side 6a; a sixth valve 37 operable with the third fluid line 25 upstream of the fifth valve 35 and just downstream of the inlet connector 5a; a seventh valve 30 operable with the second fluid line 22 just upstream of the outlet connector 11a; an eight valve 39 operable with a fluid line that is fluidly connected between the second fluid path 22 (between the second concentration sensor 13 and the seventh valve 30) and the drain connector 12a; a ninth valve 38 operable with an overflow fluid line connected between the uppermost part of the mixing chamber 46 and the fourth fluid line 26; and a tenth valve 36 (a three-way valve) arranged to direct effluent from the third fluid line 25 to the effluent container 15 (via the fluid line 23), or from the effluent container 15 and to the third fluid line 25 (via the fluid line 24), or from the third fluid line 25 and back to the third fluid line 25, without going via the effluent container 15, wherein the effluent container 15 is by-passed.

The pumps in each of the versions of system 1 described herein may be volumetric pumps, e.g., piston pumps. A sequence for system 1 may comprise one or more of the following steps.

1. Performing an initial drain, including a system prime and a level adjustment of a mixing chamber 46 and mixing stabilization of temperature and fluid composition. During this first step, the valves 31, 32, 37 and 38 are open, and the valves 30, 33, 34, 35, 36 and 39 are closed. The pumps 41, 42, 43 and 44 are operated, a level sensor (LS) senses the level in the mixing chamber 46 is active, a temperature of the fluid in the second fluid line downstream of an adding point of the glucose concentrate into the second fluid line 22 is sensed with a temperature sensor 51, a pressure in the third fluid line 25 just downstream of the sixth valve 37 is sensed with a first pressure sensor 53.
2. Performing a composition/temperature stabilization using the buffer concentrate. The buffer concentrate is then dosed with conductivity feedback while the glucose is dosed open loop. During this stabilization step, the valves 31, 32, 39 are opened, and the valves 30, 33, 34, 35, 36, 37 and 38 are closed. As in the previous step, the pumps 41, 42 and 43 are operated, the level sensor (LS) is active, a temperature is sensed with the temperature sensor 51. Also, the conductivity is sensed with the second concentration sensor 13.
3. Performing a first fill using buffer concentrate. During this step, the valves 30, 31, 32 are opened, and the valves 33, 34, 35, 36, 37, 38 and 39 are closed. As in the previous step, the pumps 41, 42 and 43 are operated, the level sensor (LS) is active, a temperature is sensed with the temperature sensor 51, and the conductivity is sensed with the second concentration sensor 13. Also, the pressure is sensed with the second pressure sensor 52.

4. Performing a first dwell, with a FO session if a sufficient amount of effluent has been collected during initial drain, see also step 7. Otherwise, during the first dwell, all valves are closed. No components are operated.

5. Performing a drain and composition/temperature stabilization (use diluted buffer (diluted PD concentrate fluid) if the FO session is performed in section 4, otherwise use buffer concentrate). During this stabilization step, with only buffer concentrate, the valves 31, 32, 37, 39 are open, and the valves 30, 33, 34, 35, 36 and 38 are closed. The pumps 41, 42, 43 and 44 are operated, the level sensor (LS) is active, a temperature is sensed with the temperature sensor 51, the conductivity is sensed with the second concentration sensor 13, and the pressure is sensed with the first pressure sensor 53. If using diluted buffer concentrate, the valves 32, 33, 37, 39 are open, and the valves 30, 31, 34, 35, 36 and 38 are closed. The pumps 41, 42 and 43 are operated, the level sensor (LS) is active, a temperature is sensed with the temperature sensor 51, the conductivity is sensed with the second concentration sensor 13, and the pressure is sensed with the first pressure sensor 53.

6. Performing a second fill (use diluted buffer concentrate if the FO session is performed in section 4, otherwise use buffer concentrate). In this fill step, with only buffer concentrate, the valves 30, 31, 32 are open, and the valves 33, 34, 35, 36, 37, 38 and 39 are closed. The pumps 41, 42 and 43 are operated, the level sensor (LS) is active, a temperature is sensed with the temperature sensor 51, the conductivity is sensed with the second concentration sensor 13, and the pressure is sensed with the second pressure sensor 52. If using diluted buffer concentrate, the valves 30, 32, 33 are open, and the valves 31, 34, 35, 36, 37, 38 and 39 are closed. The pumps 41, 42 and 43 are operated, the level sensor (LS) is active, a temperature is sensed with the temperature sensor 51, the conductivity is sensed with the second concentration sensor 13, and the pressure is sensed with the second pressure sensor 52.

7. Performing a dwell and a FO session. The first pump 41 is used to pump buffer concentrate from the bag 4a to the container 9 via the draw side 6a of the FO-unit 6. The sensed concentration with the first concentration sensor 8 is used to calculate an amount of buffer concentrate pumped to the container 9. The sensed concentration may also be used for flow control with the first pump 41. The effluent pump 44 is used to pump effluent from the effluent container 15 to a drain via the feed side 6b of the FO-unit 6. During this step, the valves 31, 34, 35 are open and the valves 30, 32, 33, 37, 38, 39 are closed. The first pump 41 and the effluent pump 44 are operated, and the first concentration sensor 8 measures the diluted buffer concentration fluid (thus, a diluted PD concentrate fluid).

8. Performing a dwell and recirculating the diluted buffer concentrate fluid to ensure uniformity (a homogenous solution). Use the first concentration sensor 8 to sense the concentration and thus the composition of the diluted buffer concentrate fluid. During this step, the valves 33 and 34 are open, and the valves 30, 31, 32, 35, 36, 37, 38 and 39 are closed. The first pump 41 is operated, and the first concentration sensor 8 measures the diluted buffer concentrate fluid (thus a diluted PD concentrate fluid).

9. Performing a drain and composition/temperature stabilization (using diluted buffer concentrate fluid). During this step, the valves 32, 33, 37, 39 are open, and the valves 30, 31, 34, 35, 36 and 38 are closed. The pumps 41, 42, 43 and 44 are operated, the level sensor (LS) is active, a temperature is sensed with the temperature sensor 51, the conductivity is sensed with the second concentration sensor 13, and the pressure is sensed with the first, drain side pressure sensor 53.

10. Performing a third fill (using diluted buffer concentrate fluid). During this step, the valves 30, 32 and 33 are open, while valves 31, 34, 35, 36, 37, 38 and 39 are closed. The pumps 41, 42 and 43 are operating, the level sensor (LS) is active, a temperature is sensed with the temperature sensor 51, the conductivity is sensed with the second concentration sensor 13, and the pressure is sensed with the second pressure sensor 52.

11. Repeat the steps 7 to 10 at least one time.

The system 1 in FIG. 3 is illustrated as a durable/disinfectable system. The system may instead be made to be at least partially disposable. The volumetric pumps may then be replaced by peristaltic pumps and scales, flowmeters or other sensors for volumetric control. The buffer concentrate and effluent flows during the FO session are optimized to maximize the buffer concentrate dilution (since this will minimize the novel pure water demand during PD fluid production). During composition/temperature stabilization, waste fluid may be fed to an effluent bag instead of drain to increase water reuse. Instead of internal tanks/containers, disposable bags may be used.

The current fluid volume in each container may instead be controlled using volumetric pumps. To determine the volume in the buffer concentrate bag, input from the first concentration sensor 8 may also be needed. The pure water container 7 may be replaced by a water purification device. If disposable bags are used to hold the pure water and effluent, the water bag may be reused to serve as next treatment's effluent bag. If so, the fresh water remaining in the pure water bag after treatment is completed may be left in the bag and be regenerated together with the effluent during the next treatment. It is also contemplated to save the last drain effluent for use in water extraction in the initial phase of the next treatment. The sensed concentration with the first concentration sensor 8 may be used for feed-forward control to the control unit 40, which may use the sensed concentration for controlling the first pump 41. The effluent container 15 may be removed to simplify the system 1. A drawback here is that the FO session then needs to be performed during the patient drains at the drain effluent flow and not during the dwells at an optimized effluent flow. This means that the total water reuse will decrease. To enable heat disinfection, the system 1 may be modified to be able to create closed hot water paths that allow disinfection of the entire system. If extended use of the FO filter is to be adopted, the filter should be included in such a path.

In an alternative embodiment of FIG. 3, the effluent bag 15 is not present, the fluid lines 23, 24 are omitted. The effluent pump 44 is then arranged to operate with the third fluid line 25. Alternatively, the three-way valve 36 directs the effluent via the fluid lines 23, 24 back to the third fluid line 25. Here, continuous flow peritoneal dialysis (CFPD) can be achieved, wherein PD fluid flow to the patient may be continuous or intermittent, but where the PD fluid is mixed on-line using water extracted from effluent.

The CFPD sequence in various embodiments comprises one or more of the following steps.

1. Draining the patient completely and running an FO session on the effluent, wherein the effluent pump 44 is used to pump effluent from the patient to drain via the FO-unit 6. The first pump 41 is pumps buffer concentrate to the container 9 via the FO-unit 6. The concentration sensor 8 senses the concentration and the volume pumped by the first pump 41 is determined to calculate the amount of buffer concentrate pumped to the container 8 and may also be used for flow control. In this step, the valves 31, 34, 36 and 37 are open and the valves 30, 32, 33, 35, 38 and 39 are closed. The first pump 41 and the effluent pump 44 are operated, the concentration sensor 8 senses the concentration, and the pressure sensor 53 senses the effluent inlet pressure.
2. Priming the fluid path 2 and adjusting level of a mixing chamber 46. In this step, the valves 31, 32, 38 are open and the valves 30, 33, 34, 35, 36, 37 and 39 are closed. The pumps 41, 42, 43 and 44 are operated, the concentration sensor 8 senses the concentration, and the level is sensed in the mixing chamber 46.
3. Stabilization of composition and temperature. Diluted buffer concentrate (diluted PD concentrate) is used if available, otherwise buffer concentrate (PD concentrate is used). The buffer concentrate is then dosed using the sensed concentration with concentration sensor 8 as feed forward control, the concentration sensed with second concentration sensor 13 as feedback, and osmotic agent from the osmotic agent source 4c is dosed in open loop.
   If buffer concentrate is used, the valves 31, 32, 39 are open and the valves 30, 33, 34, 35, 36, 37 and 38 are closed. The pumps 41, 42 and 43, the level sensor, the heater 14, the temperature sensor 51, and the concentration sensors 8, 13 are operated.
   If diluted buffer concentrate is used, the valves 32, 33, 39 are open, and the valves 30, 31, 34, 35, 36, 37 and 38 are closed. The pumps 41, 42 and 43, the level sensor, the heater 14, the temperature sensor 51, and the concentration sensors 8, 13 are operated.
4. Filling intended volume into patient. Diluted buffer concentrate is used if available, otherwise buffer concentrate is used.
   If buffer concentrate is used the valves 30, 31 and 32 are open, while the valves 30, 33, 34, 35, 36, 37, 38 and 39 are closed. The pumps 41, 42 and 43, the level sensor, the heater 14, the temperature sensor 51, the concentration sensors 8, 13 and the second pressure sensor 52 are operated.
   If diluted buffer concentrate is used: the valves 30, 32 and 33 are open, while the valves 30, 31, 34, 35, 36, 37, 38 and 39 are closed. The pumps 41, 42 and 43 are operating, the level sensor, the heater 14, the temperature sensor 51, the concentration sensors 8, 13 and the second pressure sensor 52 are operated.
5. Continuous flow treatment. The system pump 43 is set to pump a fill flow, and the effluent pump 44 is set to pump the drain flow. Ultrafiltration rate (UFR) is known from a model and/or patient history, and a speed difference between speed of system pump 43 and speed of effluent pump 44 is set accordingly to maintain a fill volume constant. The FO session and mixing are in one embodiment continuous as the effluent is pumped through the FO-membrane 6c and water is extracted from the filter to dilute the buffer concentrate. The diluted buffer concentrate is used for mixing. Buffer concentrate is then dosed using the sensed concentration with concentration sensor 8 as feed forward control, the concentration sensed with second concentration sensor 13 as feedback, and wherein osmotic agent is dosed from the osmotic agent source 4c in open loop. In this step, the valves 30, 31, 32, 36 and 37 are open and the valves 33, 34, 35, 38 and 39 are closed. The pumps 41, 42, 43, 44 are operated, while the level sensor, the heater 14, the temperature sensor 51, the second concentrate sensor 13, the first pressure senor 53 and the second pressure sensor 52 are used.
6. Intermittent draining+refilling. A complete drain is performed to establish a fill volume reference (prevent over/under fill). The following steps are performed:
   a. the patient is drained completely with feedback from first pressure sensor 53. An FO session is run as per step 1, and diluted buffer concentrate is accumulated in the container 9.
   b. the drained volume is compared with assessed volume to adjust the UFR assessment accordingly if needed.
   c. steps 4. and 5. (and possibly 6.) are repeated.

In the alternative system 1 of FIG. 3, the effluent flow to the FO-membrane 6c during the FO sessions is determined by the treatment settings (drain flow rate and CFPD flow rate) and may be difficult to optimize for buffer concentrate dilution. The diluted buffer concentrate flow during CFPD is controlled by the first pump 41, and thus by the control of the first pump. The diluted buffer concentrate flow rate during complete drain is optimized to maximize the buffer concentrate dilution (to minimize the novel pure water demand during PD fluid production). Instead of disposable bags, internal tanks or containers may be used. The current fluid volume in each container, bag or tank is maintained by monitoring the volumetric pumps. To determine the volume in the PD concentrate bag 4a (e.g. buffer concentrate), input from concentration sensor 8 is used. The pure water container 7 may be replaced by a water purification device (not shown). The CFPD treatment may be performed using two single lumen patient lines or one double lumen patient line connecting to the patient catheter (which may be a dual lumen catheter.) The container 9 may be removed to simplify the system. A drawback is that FO sessions during the complete drains is disabled so the total water reuse is decreased. To enable heat disinfection, the system 1 is modified to be able to create closed hot water paths that allow disinfection of the entire system. If extended use of the FO-filter 6c is adopted, the FO-membrane 6c is included in fluid path 2.

The system 1 in FIG. 4 is explained together with a proposed sequence for producing fluid for PD, including diluted concentrate fluid and final PD fluid. The system 1 in FIG. 4 has the same reference numbers for the same parts as in the system in FIGS. 1 and 3. In FIG. 4, a plurality of valves are illustrated. The valves include an eleventh valve 61 arranged to operate with the ninth fluid line 29, a twelfth valve 62 arranged to operate with the eight fluid line 28, a thirteenth valve 63 arranged to operate with the third fluid line 25, a fourteenth valve 64 arranged to operate with the second fluid line 22, a fifteenth valve 65 arranged to operate with the third fluid line 25 just upstream of the inlet to the feed side 6a, a sixteenth valve 66 arranged to operate with a fluid line 24 for transporting effluent from the third fluid line 25 to the effluent container 15, a seventeenth valve 67 arranged to operate with a fluid line 23 between the fluid line 24 and the third fluid line 25, wherein the fluid line 23 is arranged to transport effluent from the effluent container 15 to the third fluid line 25 for transport to the feed side 6b of the FO-unit 6.

The sequence of FIG. 4 comprises one or more of the following steps.

Performing an Initial Drain:

1. Draining effluent from the patient to the effluent bag. During this first step, the valves 63, 66, 68 are open, and the valves 61, 62, 64, 65, 67 are closed. During this step, the effluent pump 44 is operated, a first weigh scale 71 is arranged to measure the weight of the effluent bag 15, and the pressure sensor 52 senses the pressure in the third fluid line 25. Thus, the effluent pump 44 is pumping the effluent from the patient into the effluent bag via the third fluid line 25 and the fluid line 24. First weigh scale 71 may be provided with any version or embodiment of system 1 described herein.

Performing a First Fill:

2. Heating the prefilled glucose-free PD fluid in the container 9 during recirculation and checking conductivity. The PD fluid is recirculated in the circulation path comprising the fifth fluid line 18, part of the second fluid line 22, the sixth fluid line 27 and the container 9. During this step, the valve 64 is open and the valves 61, 62, 63, 64, 65, 66, 67 and 68 are closed. The heater 14 is operated to heat the PD fluid to, e.g., body temperature (e.g. 37° C.). The system pump 43 is operated and the first concentration sensor 8 senses the conductivity. This step may also include addition of glucose concentrate if prescribed (for this first fill).
3. Priming the patient fluid line 5/11 and then connecting the patient. During this step, the valve 63 is open and the valves 61, 62, 64, 65, 66, 67, 68, are closed. The system pump 43 is operated and a second weigh scale 72 is arranged to measure the weight of the container 9. Second weigh scale 72 may be provided with any version or embodiment of system 1 described herein. Also, any version of system 1 described herein may include a third weigh scale 73 positioned and arranged as illustrated in FIG. 4 to weigh the contents of any of the concentrate containers, such as first PD concentrate (e.g., buffer) container 4a.
4. Filling the patient with the PD fluid. During this step, the valve 63 is open and the valves 61, 62, 64, 65, 66, 67, 68 are closed. The system pump 43 is operated, the second weigh scale 72 is arranged to measure the weight of the container 9, and the first pressure sensor 52 senses the pressure in the third fluid line 25.

Emptying Container 9 from PD Fluid:

5. Draining any remaining PD fluid in the container 9 to the effluent container 15 (to keep track of the volume in the container 9 during next batch preparation). During this step, the valves 66 and 68 are open and the valves 61, 62, 63, 64, 65, 67 are closed. The system pump 43 is operated and the first pressure sensor 52 monitors the pressure.

Preparation for Second Fill Batch:

6. Performing an FO session including pre-diluting the buffer concentrate (into diluted PD concentrate) prior to addition to the container 9. The effluent is pumped through the feed side 6b of FO-unit 6 from the effluent container 15 to drain 75. Meanwhile, the diluted buffer concentrate is pumped from concentrate container 4a, through the draw side 6a of FO-unit 6 to the container 9. The amount of buffer concentrate dosed to the container 9 is tracked using the first concentrate sensor 8 and the second weigh scale 72. The pump speeds of the first pump 41 and the effluent pump 44 are controlled to maximize the dilution of the buffer concentrate and to reach the target amount of buffer concentrate to be added to the container 9. During this step, the valves 65, 67 are open, and the valves 61, 62, 63, 64, 65, 66, 67 and 68 are closed. The first pump 41 and the effluent pump 44 are operated, the first pressure sensor 51 senses the pressure, the concentration sensor 8 senses the concentration, and the first weigh scale 71 and the second weigh scale 72 measures the weight of the effluent and the diluted PD concentrate in the container 9.
7. Adding water from the water container 7 to the container 9. The amount of added water matches the dosed amount of buffer concentrate and the sensed concentration of the fluid in container 9. During this step, the valve 62 is open, and the valves 61, 63, 64, 65, 66, 67, 68 are closed. The system pump 43 is operated and the second weigh scale 72 measures the weight of the container 9.
8. Recirculating, heating and checking the conductivity. The diluted PD concentrate is recirculated in the circulation path including the fifth fluid line 18, part of the second fluid line 22, the sixth fluid line 27 and the container 9. During this step, the valve 64 is open and the valves 61, 62, 63, 64, 65, 66, 67 and 68 are closed. The heater 14 is operated to heat the PD fluid to, e.g., body temperature (37° C.), the system pump 43 is operated and the first concentration sensor 8 senses the conductivity.
9. Adding an osmotic agent, here glucose concentrate, with scale feedback. During this step, the valve 61 is open, and the valves 62, 63, 64, 65, 66, 67, 68 are closed. The system pump 43 is operated, and the second weigh scale 72 is measures the weight of the container 9.
10. Recirculating and checking conductivity decrement. The diluted PD concentrate, that now is a final PD fluid for treatment, is recirculated in the circulation path including the fifth fluid line 18, part of the second fluid line 22, the sixth fluid line 27 and the container 9. During this step, the valve 64 is open and the valves 61, 62, 63, 64, 65, 67, 68 are closed. The heater 14 is operated to heat the PD fluid to, e.g., body temperature (37° C.), the system pump 43 is operated and the first concentration sensor 8 senses the conductivity.

Ongoing:

11. Steps 4 to 10 are repeated at least one time.

The system 1 in FIG. 4 is illustrated as having a disposable fluid line. The pumps are here peristaltic pumps, and the system 1 comprises scales and pinch valves. However, the system may alternatively be durable and thus a disinfectable system. The peristaltic pumps and scales (or level sensors) may then be replaced with volumetric pumps. The illustrated system may produce PD fluid that is ultimately collected in the container 9. However, for the first fill the container 9 may contain sterile PD fluid (as there might be no effluent that has been drained from the patient). Here, the container 9 will serve as a mixing bag for subsequent fill batch preparations. The system 1 in FIG. 4 thus acts as a mixing system with batch-wise PD fluid production. Instead of disposable bags, internal tanks may be used. The pure water container may be replaced by a water purification device. If disposable bags are used to hold the pure water and effluent, the water bag may be reused to serve as a next treatment's effluent bag. If so, the fresh water remaining in the pure water bag after treatment is completed may be left in the bag and then be regenerated together with the effluent during the next treatment.

The last drain effluent may be saved and used for water extraction in the initial phase of the next treatment. To perform heat disinfection, the system 1 may be modified to be able to create closed hot water paths that allow disinfection of the entire system. If extended use of the FO-membrane 6*c* is to be adopted, the FO-membrane 6*c* is be included in such a path.

Figure 5:
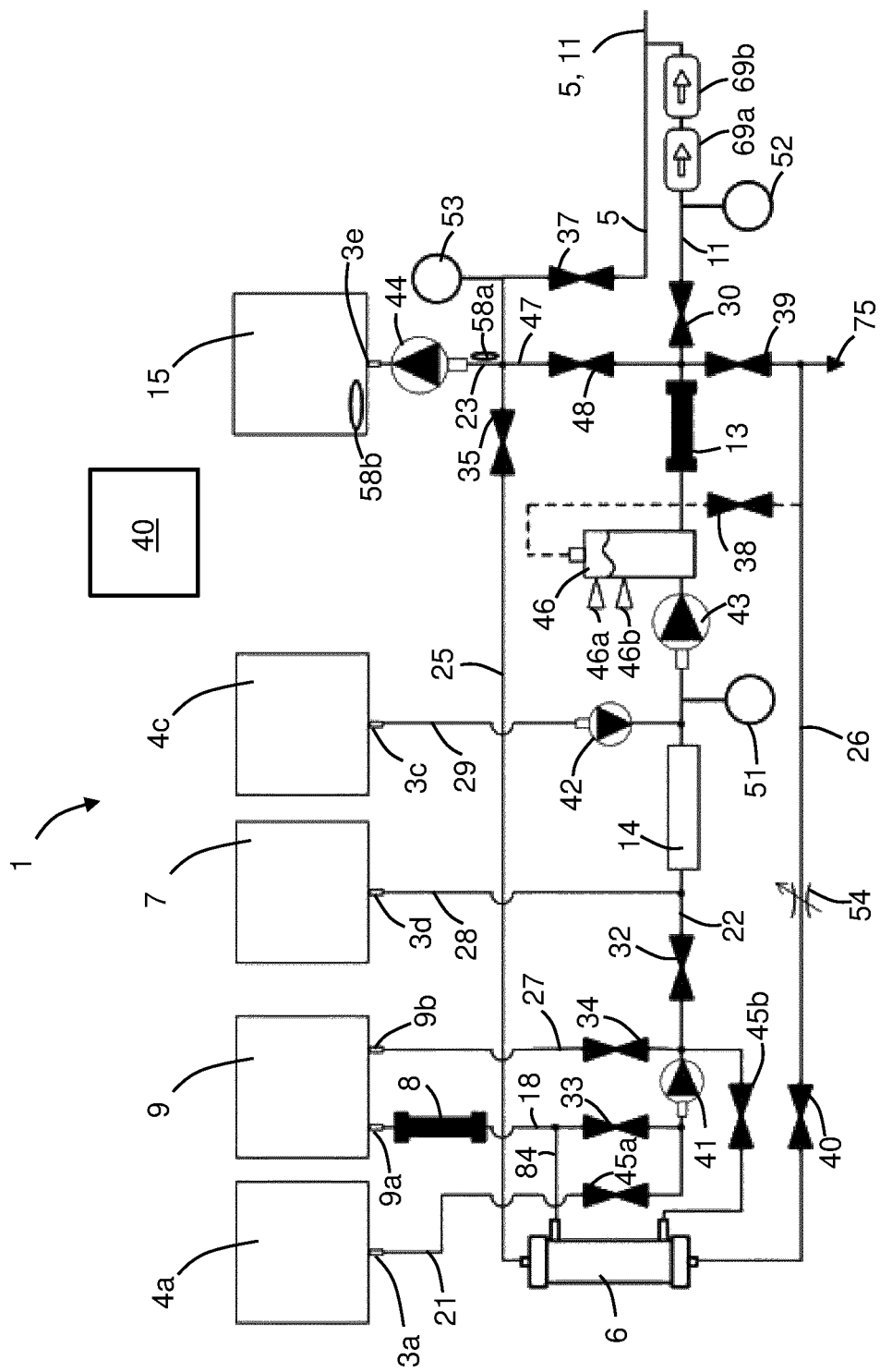

Referring now to FIG. 5, an additional alternative embodiment for system 1 under control of control unit 40 is illustrated. System 1 of FIG. 5 includes many of the same components described and numbered the same as above. In particular, system 1 of FIG. 5 includes patient inlet/outlet line 5, 11, effluent leg line 5, third or effluent fluid line 25 leading to the feed side of forward osmosis-(FO-) unit 6. Fourth or reject fluid line 26 is connected between an outlet of the feed side of FO-unit 6 and runs to drain 75. Second or fresh dialysis fluid line 22 is fluidly connected between an outlet of the draw side of FO-unit 66*a* and runs to fresh leg line 11 of patient inlet/outlet line 5, 11.

Osmotic agent source 4*c* is connected to fresh dialysis fluid line 22 downstream of heater 14 via ninth fluid line 29, which is connected to source 4*c* at osmotic agent connector 3*c*. Pure water container 7 is connected to fresh dialysis fluid line 22 upstream of heater 14 via eighth fluid line 28 and water source connector 3*d*. Effluent container 15 is connected to effluent fluid line 25 upstream from FO-unit 6 via fluid line 23 and effluent container connector 3*e*. Diluted PD concentrate (e.g., buffer) container 9 is fluidly connected to (i) sixth or inlet line 27 via second port 9*b* and (ii) fifth of outlet line 18 via first port 9*a*.

One difference with system 1 of FIG. 5 is that PD concentrate (e.g., buffer) container 4*a* does not connect directly to the draw side of FO-unit 6 and is instead connected to fresh dialysis fluid line 22 via first fluid line 21 and first PD concentrate connector 3*a*. Such arrangement allows for the flowrate of the first PD concentrate to be known directly from the known speed of the first or diluting pump 41 (providing open loop control).

System 1 of FIG. 5 includes multiple valves each under control of control unit 40 (e.g., electrically actuated, energized open solenoid pinch valves). The valves include sixth valve 37 located along and allowing or disallowing flow through effluent leg line 5. The valves include fifth valve 35 located along and allowing or disallowing flow through third or effluent fluid line 25. The valves include first valve 32 located along and allowing or disallowing flow through dialysis fluid line 22. The valves include seventh valve 30 located along and allowing or disallowing flow through fresh leg line 11. The valves include eighth or bypass valve 39 located along and allowing or disallowing a bypass flow of fresh dialysis fluid to drain 75. The valves include reject valve 55 located along and allowing or disallowing flow through fourth or reject fluid line 26 to drain 75. The valves include ninth or vent valve 38 located along and allowing or disallowing vent flow from a top of mixing chamber 46 to drain 75. The valves include inlet and outlet valves 34 and 33, respectively, allowing or disallowing flow through inlet and outlet lines 27 and 18, respectively, into and out of diluted PD concentrate (e.g., buffer) container 9. The valves include PD concentrate (e.g., buffer) valve 45*a* located along and allowing or disallowing flow through first fluid line 21 from PD concentrate (e.g., buffer) container 4*a* to dialysis fluid line 22. The valves also include valve 45*b* allowing or disallowing filtered forward osmosis water from the draw side FO-unit 6 to dialysis fluid line 22.

System 1 of FIG. 5 includes multiple fluid pumps each under control of control unit 40 (e.g., electrically actuated, volumetric pumps or piston pumps that are inherently accurate and capable of providing a desired flow rate and volume). The pumps include first or diluting pump 41 that dilutes PD concentrate (e.g., buffer) from container 4*a* with filtered forward osmosis water from the feed side of FO-unit 6. The pumps include second PD concentrate (e.g., glucose) pump 42 to accurately meter the concentrate from container 4*c* to dialysis fluid line 22. The pumps include third or system pump 43 to mix first diluted concentrate (e.g., buffer) with second concentrate (e.g., glucose). The pumps also include fourth or effluent pump 44 for pumping patient effluent to and from effluent container 15.

System 1 of FIG. 5 includes mixing chamber 46 for mixing a final PD fluid having a prescribed concentration of the two or more PD concentrate fluids (e.g., buffer and glucose). Mixing chamber 46 is in one embodiment small in size and does not hold a complete volume for filling and may alternatively be an enlargement of second fluid line 22. Mixing chamber 46 also serves as a gas trap that allows gas (e.g., air) to migrate out of the final PD fluid into the top of the gas trap. Mixing chamber 46 in the illustrated embodiment is made to operate with level sensors 46*a* and 46*b*, which output to control unit 40, wherein control unit 40 uses the signals from sensors 46*a* and 46*b* to operate system pump 43 so as to maintain a desired final PD fluid level between the sensors.

Other sensors in system 1 of FIG. 5, each outputting to control unit include inlet pressure sensor 53, the output of which is used to control a negative patient pumping pressure, e.g., via effluent pump 44, to a safe level such as −0.10 bar (−1.5 psig) or less and to sense and control the feed side pressure when an FO session is terminated. Other sensors include first concentration sensor 8, which senses the conductivity of diluted first PD concentrate (e.g., buffer), the output of which may be used to control first or diluting pump 41 to achieve a desired conductivity at concentration sensor 8. Other sensors include temperature sensor 51, the output of which may be used to control a power input to heater 14 to heat the final PD fluid to a desired body temperature, e.g., 37° C. Other sensors include second concentration sensor 13, which senses the conductivity of the final PD fluid (e.g., including buffer and glucose concentrates), the output of which may be used to control second PD concentrate (e.g., glucose) pump 42 and first or diluting pump 43 to achieve a desired final PD fluid conductivity at concentration sensor 13. Other sensors also include outlet pressure sensor 52, the output of which is used to control a positive patient pumping pressure, e.g., via system pump 43, to a safe level such as 0.21 bar (3.0 psig) or less.

While system 1 of FIG. 5 is illustrated as having a pure water container 7, container 7 may not be needed, which is desirable because the patient then does not have to install a large water container for each treatment. To eliminate pure water container 7, the amount of water needed for an entire treatment is filtered from the patient's effluent, where it is then assumed that PD concentrate from container 4*a* can be diluted as needed to form a final PD fluid. To have enough effluent, it is contemplated for control unit 40 to save the patient's effluent from a prior treatment for use as a feed solution for a current treatment. Effluent container 15 may accordingly be a reusable container, which is large enough to hold the treatment's worth of effluent, e.g., to be on the order of six to eight liters in volume. It is also contemplated for control unit 40 to begin the FO filtration of the effluent and the diluting of PD concentrate from container 4*a* (e.g., buffer) well before the beginning of treatment. Here, diluted PD concentrate (e.g., buffer) container 9 is also reusable and sized to hold a large amount of diluted PD concentrate before the start of treatment, e.g., to be on the order of six to eight liters in volume. Also, control unit 40 may perform the FO session using slow or low flow rates, which is beneficial because a larger percentage of filtered water may be extracted.

It is likely that the patient begins treatment full with a last fill volume from a previous treatment or from a mid-day exchange. Control unit 40 causes that effluent to be pulled into effluent container 15 (which may now be empty after the slow FO filtration) at the start of treatment for storage with newly produced effluent produced over the current treatment. It is worth noting that in system 1 of FIG. 5, water extraction may be performed during the patient dwell phases of the current treatment, which is in addition to the daily water extraction.

Another difference with system 1 of FIG. 5 is the provision of one or more ultraviolet ("UV") lamp 58*a*, 58*b* positioned at or at an inlet to effluent container 15 (which may be provided with any version of system 1 discussed herein). One or more UV lamp 58*a*, 58*b* is positioned to irradiate the effluent and begin the disinfection of the effluent, lessening the pathogen load on FO-unit 6. UV lamps 58*a*, 58*b* may be provided with any of the versions of system 1 described herein.

To dilute first concentrate from container 4*a* (e.g., buffer), control unit 40 causes the first concentrate to be introduced into second fluid line 22, while valves 45*a* and 45*b* are open and valves 32, 33 and 34 are closed. The concentrate is thus forced into FO-unit 6 for dilution, after which the concentration or conductivity of the diluted concentrate is taken via sensor 8 and the diluted concentrate is stored in diluted PD concentrate container 9. If needed, the diluted PD concentrate may be recirculated past sensor 8 by opening valves 33 and 34 and running diluting pump 41. When the first concentrate is introduced into FO-unit 6 via valve 45*b* as discussed above, water extraction is active and diluting pump 41 may then be run open loop knowing the set speed of the diluting pump.

As mentioned above, in various embodiments of FIG. 5, all FO filtration takes place in FO-unit 6 between treatments, i.e., prior to the present treatment. In other embodiments, FO filtration may take place in FO-unit 6 between treatments and during any one or more dwell during treatment. In still other embodiments, no FO filtration takes place in FO-unit 6 between treatments and instead all FO filtration takes place at the start of treatment and during patient dwells. The embodiment chosen dictates the sizes of effluent container 15 and diluted PD concentrate container 9 with the more filtration occurring between treatments requiring larger containers.

For any of the versions of system 1, including that of FIG. 5, the flow rates created by effluent pump 44 and diluting pump 41 depend on the effluent volume available and time available for water extraction. Lower flow rates for these pumps increase the extraction efficiency as discussed herein. The flow rates for pumps 41 and 44 also depend on the size of the FO-unit 6. A larger surface area for the unit increases the efficiency, which may allow for higher flow rates. Overall, it is the combination of effluent flow rate, concentrate flow rate and membrane surface area that determines the efficiency.

In various examples, having two liters of effluent during a two hour dwell (providing approximately 110 minutes of time available for extraction) results in a flow rate of eighteen ml/min, which is considered to be slow. Three liters of effluent over a one hour dwell may result in a flow rate of 60 ml/min, which is considered to be fast. If dwell time and day time are available, it can for example mean that twelve liters of effluent may be processed during six hours of night dwells and eight hours during day (totaling fourteen hours, which results in an effluent flow of fourteen ml/min, which is considered very slow and efficient). The really low effluent flow rate of 14 ml/min can be used to increase the efficiency or to decrease the membrane surface area of FO-unit 6 with maintained efficiency. The low flow rate also means that extraction may be performed efficiently only during the day and not during treatment dwells. Another alternative is to increase the membrane surface area of FO-unit 6 to allow higher effluent flow rate and maintain efficiency.

The flow rates of system pump 43 and second PD concentrate pump 42 may be higher than the FO session flow rates, e.g., one the order of 100 to 250 ml/min because the efficiency of FO-unit 6 is not a concern and because it is desirable to fill the patient as fast as safely possible to reduce treatment time and so that a larger percentage of the treatment time is used for patient dwells in which the patient is being treated.

It is contemplated to maintain a pressure gradient between the feed side and the draw side of FO-unit 6, wherein the feed side pressure is greater than the draw side pressure. Doing so increases the water extraction efficiency of FO-unit 6. The pressure gradient or ΔP may be anywhere above zero bar to four bars (58 psig) or higher depending on the manufacturer of the FO-unit. FIG. 5 illustrates one way to create a higher feed side pressure, which is to place line 26 in operable communication with a variable restrictor 54 under control of control unit 40. Control unit 40 causes variable restrictor 54 to partially occlude line 26, creating an increased backpressure in the feed side of FO-unit 6. The pressure gradient may be caused alternatively or additionally by lowering the pressure on the draw side of FO-unit 6. It is contemplated to lower the draw side pressure hydrostatically by structuring system 1 so that diluted PD concentrate container 9 resides elevationally low relative to FO-unit 6.

Extraction efficiency does not depend on the pressure output of system pump 43. Instead the pressure outputted by system pump 43, as measured by outlet pressure sensor 52, is controlled so that final PD fluid is delivered safely to the patient, e.g., 0.21 bar (3.0 psig) or less.

It may be possible to increase extraction efficiency alternatively or additionally by heating or increasing the temperature of FO-unit 6. For example, if it is desirable to have a higher FO-unit 6 temperature, an additional or alternative heater, e.g., pre-heater (not illustrated), may be placed along effluent fluid line 25, which heats or increases the temperature of the effluent, which in turn heats or increases the temperature of FO-unit 6 and FO-membrane 6*c*. The increased effluent temperature may for example be anywhere from slightly higher than ambient temperature to 50° C. or perhaps higher depending on the requirements of the FO-unit. The temperature to which the effluent is heated is selected so that FO-unit 6 is in turn heated to a desired level, and also so that the final PD fluid delivered to the patient may be set to be around body temperature or 37° C. It may be found that FO-unit 6 acts as a heat sink such that even if the effluent is heated to 50° C., the diluted concentrate leaving FO-unit 6 is less than 50° C., such that heating via downstream heater 14 is still needed. Fouling in effluent fluid line 25 is also a consideration in determining the temperature to which the effluent is heated because higher temperatures may increase fouling. The reason why an increase in extraction efficiency occurs by heating FO-unit 6 may be linked to an increased flux across FO-membrane 6c.

It is accordingly expressly contemplated for any version of system 1 discussed herein to manipulate, select or set any one or more of membrane surface area, feed side and draw side flow rates, pressure gradient ΔP or transmembrane pressure across the membrane, and/or increased FO-membrane temperature to achieve a desired exchange efficiency. Those variables are balanced against cost and ease of use to produce an overall desirable system 1.

It is also expressly contemplated for any version of system 1 discussed herein to replace conductivity sensor 8 with two weigh scales (or provide the weigh scales additionally), one that measures the weight of diluted PD concentrate container 9 and another one that measures the weight of the first concentrate in first concentrate container 4a. Here, control unit 40 knows the concentration of the first concentrate in first concentrate container 4a, such that the concentration/conductivity of the diluted first PD concentrate may be determined based on that knowledge and the weigh scale measurements outputted to control unit 40. The weigh scales may be beneficial if it is found that conductivity for example is difficult to measure. The weigh scales may be configured and arranged the same as weigh scales 71, 72 and 73 illustrated in FIG. 4.

In an alternative embodiment, if diluting pump 41 is of an accurate type, e.g., a membrane or piston pump, then a single weigh scale provided with diluted PD concentrate container 9 may only be needed. That is, control unit 40 knows how much first PD concentrate is pulled from first concentrate container 4a based on the known number of strokes performed by accurate diluting pump 41. What is not known is how much filtered water comes across the membrane of FO-unit 6 to dilute the first PD concentrate. The weigh scale provided with diluted PD concentrate container 9 however provides this information. Control unit 40 may therefore determine the concentration/conductivity of the diluted first PD concentrate again knowing the concentration of the first PD concentrate.

FIG. 1 illustrates that an optional additional PD concentrate bag 4b may be connected via an optional bag connector to an additional PD concentrate connector 3b. It is further expressly contemplated for any version of system 1 discussed herein to use separate containers or bags 4a and 4b to separate a single concentrate into components that can have higher concentrations, such as a concentrated NaCl component solution. The concentrated component solution enables the draw solution to become stronger. In an example for NaCl being the concentrated component solution, the draw solution may become about twice as strong (e.g., about 11 Osm/l compared to 5.4 Osm/l). The separated concentrated component solution has the benefit that lower total fluid volume is shipped to patient. The concentrated component solution is dosed separately from the dosing of the remainder of the overall concentrate from the other container 4a, 4b.

Providing a concentrated NaCl solution also allows for sodium profiling, where NaCl is dosed according to a patient's physiological makeup or need. The dosing of the NaCl may be varied over the course of treatment according to the profile under the control of control unit 40. The variation of the sodium profile, e.g., more in the beginning of treatment and less at the end of treatment, is set to provide a treatment benefit to the patient.

FIG. 5 (and FIG. 6 discussed below) illustrates an optional line 47 and valve 48 under control of control unit 40, which may be provided for any of the versions of system 1 described herein. Optional line 47 and valve 48 may be considered to be a bypass valve. Optional line 47 and valve 48 allow for any fluid sent to drain 75 to be delivered instead to effluent container 15 for reprocessing at FO-unit 6. For example, the volume of mixed fluid that does not yet have the correct concentration, which may normally be sent to drain during online mixing, may here instead be pumped with valve 48 open and valves 30, 38 and 39 closed to effluent container 15 for later extraction at FO-unit 6.

Another option for any of the versions of system 1 described herein is for diluted PD concentrate container 9 to be provided initially with purified or sterilized water, enabling purified water container 7 to be removed while still providing source of water. Diluted PD concentrate container 9 is only partially filled with purified or sterilized water, e.g., 10% to 40%, allowing diluted first PD concentrate exiting the draw side of FO-unit 6 to be mixed with the water for further dilution.

Figure 6:
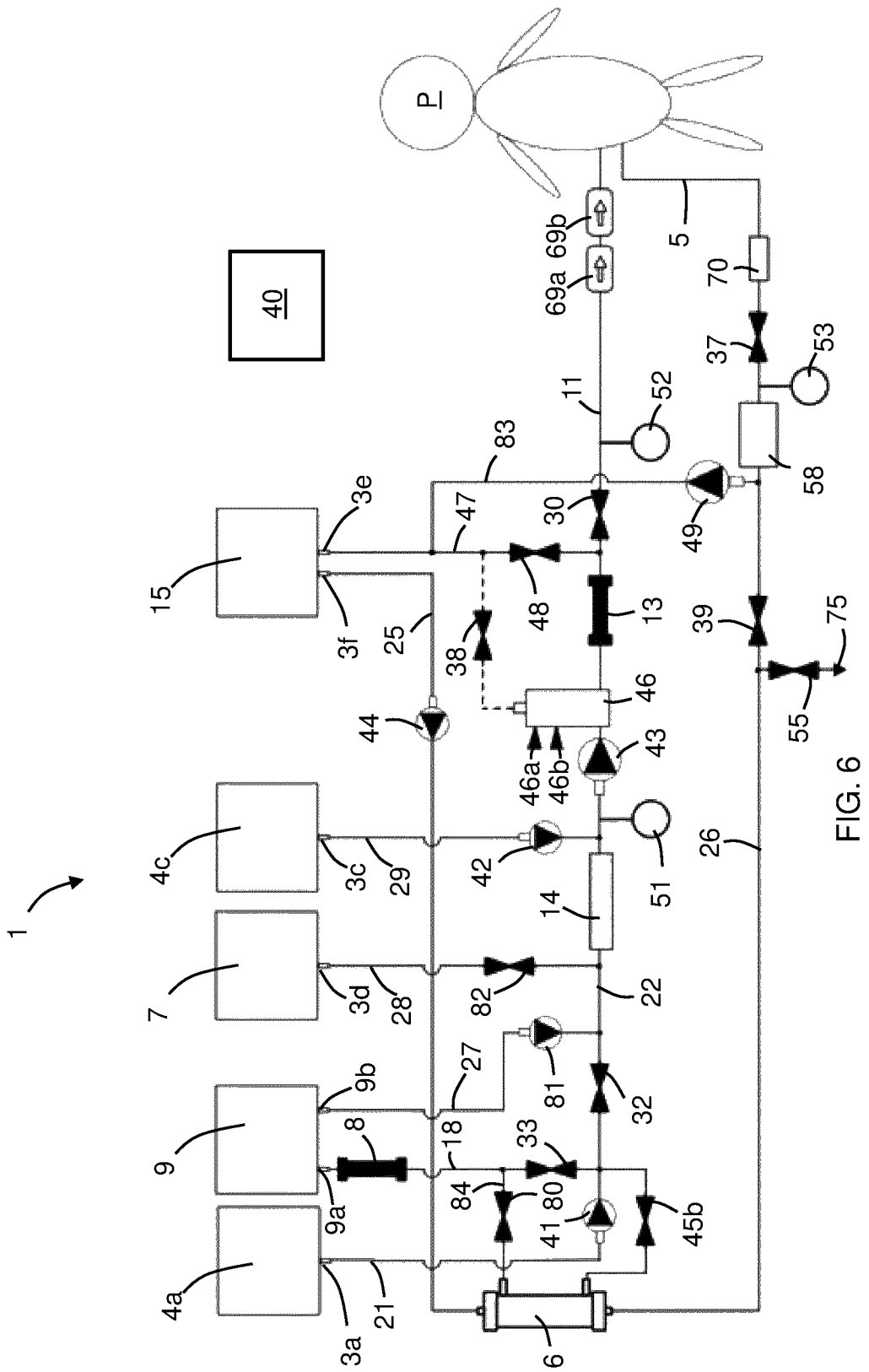

Referring now to FIG. 6, an alternative CFPD version of system 1 under control of control unit 40 is illustrated. FIG. 6 includes many of the same components as the earlier described version of system 1, which are numbered the same and include all structure, functionality and alternatives discussed above for the like numbered components. In FIG. 6, effluent container 15 includes effluent container connector 3e, which is here an inlet connector, and an additional effluent container connector 3f, allowing effluent to flow into and out of effluent container 15. An additional drain pump 49 under control of control unit 40 allows effluent incoming from line 5 to be pumped to effluent container 15, while effluent pump 44 independently pumps effluent into the feed side of FO-unit 6. Diluting pump 41 may at the same or different time pump first PD concentrate from container 4a into the draw side of FO-unit 6. Second PD concentrate pump 42, system pump 43 and concentrate pump 81 operate as described below to add and mix a second PD concentrate to form a final PD solution.

In particular, control unit 40 of system 1 in FIG. 6 is in one embodiment programmed to run in a CFPD mode in which effluent is removed slowly from patient P to effluent container 15 via drain pump 49 and valve 37. Control unit 40 at the same time fills patient P at the same rate (or may be a different flow rate than the drain flow rate, e.g., to account for ultrafiltration) via system pump 43 and valve 30. If the fill and drain flow rates are the same, the net volume within the patient does not change other than the volume of fluid absorbed as ultrafiltration ("UF"). Control unit 40 causes effluent pump 44 to remove effluent from effluent container 15 to the feed side of FO-unit 6 at a flow rate that is desirable for FO extraction, wherein the portion of effluent that is not extracted is delivered to drain 75 from the FO-unit via valve 55. At the same or different time, control unit 40 causes diluting pump 41 to pump first PD concentrate through the draw side of FO-unit 6 via valves 45b and 80 at a desired flow rate to deliver a required amount of diluted PD concentrate to container 9. At the same or different time, control unit 40 causes first PD concentrate pump 81 to remove diluted first PD concentrate from diluted PD concentrate container 9 and deliver same to second fluid line 22. PD concentrate pump 81 may be controlled so that the proper conductivity at sensor 13 is reached (wherein the first PD concentrate pump 41 and effluent pump 44 are controlled to follow the flow rate of PD concentrate system pump 43 in one embodiment). Control unit 40 also causes system pump 43 to pull a desired amount of purified water from purified water container 7 via valve 82. Control unit 40 also causes second PD concentrate pump 42 and system pump 43 to run at fixed flow rates, which in one embodiment are according to a flow rate ratio pump 43/pump 42 determined in an initial phase (in that initial phase, when the produced fluid is not yet a correct PD fluid, the fluid may be directed to the effluent container 15 via valve 48 so as not to lose the fluid to drain). System pump 43 pumps final PD fluid to patient P via valve 30.

Control unit 40 of system 1 of FIG. 6 may alternatively or additionally be programmed to run a batch-type APD treatment. In FIG. 6, with all valves closed except valves 45b, 55 and 80, which are open, system 1 may perform a dwell phase in which final PD fluid dwells within the peritoneal cavity of patient P for a specified period of time. Control unit 40 at the same time may run effluent pump 44 and diluting pump 41 to perform FO and create and deliver new diluted first PD concentrate to diluted PD concentrate container 9.

In either CFPD and APD modes, control unit 40 may be programmed to simultaneously run an FO session and drain patient P. Here, in addition to valves 45b, 55 and 80 being open and pumps 44 and 41 running, valve 37 is open and drain pump 49 is operated to pull effluent from patient P to effluent container 15. Drain valve 55 is open to allow drain fluid to flow to drain 75.

In either CFPD and APD modes, control unit 40 may be programmed to simultaneously run an FO session and fill patient P with fresh, heated final PD fluid. Here, when water is needed for further dilution, in addition to valves 45b, 55 and 80 being open (valve 37 optionally being open) and pumps 44 and 41 running, valves 30 and 82 (water valve) are open (valve 32 is closed) and pumps 81, 42 and 43 are operated. If the diluted first PD concentrate is instead too diluted, or if diluted PD concentrate container 9 is empty, valve 32 may be opened to allow pure first PD concentrate from container 4a to be delivered to second fluid line 22 via diluting pump 41.

FIG. 6 enables CFPD (and APD) system 1 to be as water-efficient as possible, wherein the effluent flow rate using effluent pump 44 may be lower than the patient drain flow rate using drain pump 49. Control unit 40 is able to control effluent pump 44 to pump to FO-unit 6 for an FO session independently of the drain flow rate pumped by via drain pump 49. In one example, a complete drain is performed at 200 ml/min using drain pump 49, while a low and efficient effluent flow of e.g. 30 ml/min is provided by effluent pump 44.

It should also be appreciated that the placement of drain pump 49 enables system 1 to perform complete drains of the patient, wherein all effluent may be moved to effluent container 15 via pump 49 and then run an FO session using the effluent.

Figure 7:
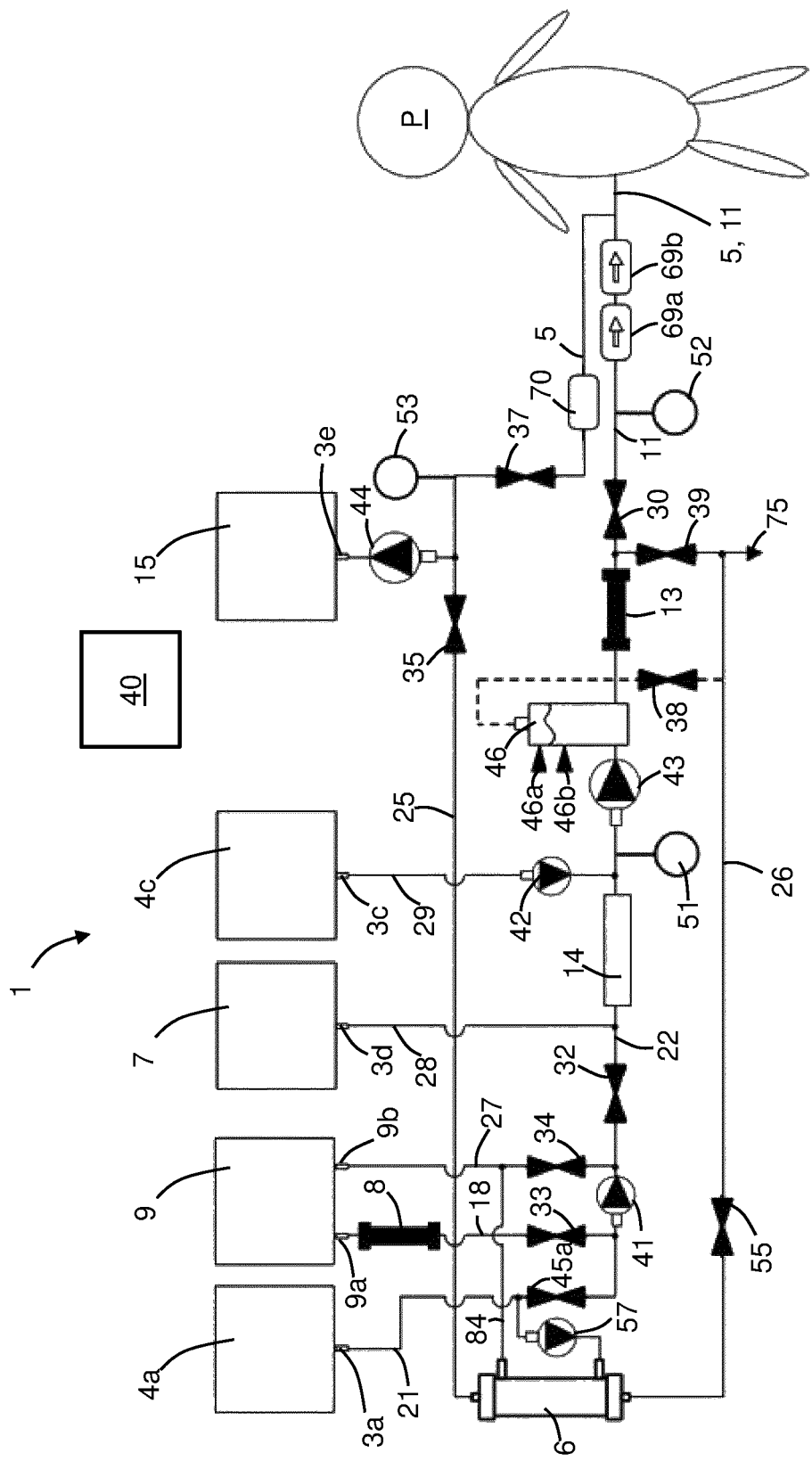

FIGS. 5 to 7 illustrate that any version of system 1 discussed herein (e.g., batch system of FIG. 5 and continuous system of FIG. 6) may operate by placing one or more sterilizing grade filter 69a, 69b along patient fluid line 11 in FIGS. 5 to 7. One or more sterilizing grade filter 69a, 69b may be around 0.2 micron (could be more or less) in pore size, which places the final PD fluid in a sterile condition suitable for delivery to patient P. The one or more filter 69a, 69b may for example allow for the water in purified water container 7 to be maintained at a purified level instead of a sterilized level. Two sterilizing grade filters 69a and 69b provide redundancy in case one of the filters fails. Again, sterilizing grade filter 69a, 69b may be provided with any embodiment of system 1 discussed herein.

FIG. 6 also illustrates that any version of system 1 discussed herein may include a coarse or pre-filter 70 located along effluent line 5. In FIG. 7 discussed below, or any other batch version of system 1, coarse filter 70 may be located along effluent leg line 5, while sterilizing grade filters 69a and 69b are located along fresh leg line 11 leading to common effluent/fresh patient fluid line 5/11. Coarse filter 70 may for example have larger pore sizes that are selected to remove fibrin or other patient materials, preventing same from reaching FO-unit 6. Coarse filter 70 may also reduce fouling at FO-unit 6. Again, coarse filter 70 may be provided with any embodiment of system 1 discussed herein.

Referring now to FIG. 7, an alternative online batch version of system 1 is illustrated. FIG. 7 includes many of the same components as the earlier described systems, which are numbered the same and include all structure, functionality and alternatives discussed above for the like numbered components. In FIG. 7, a dedicated first PD concentrate pump 57 under control of control unit 40 is provided, which is located along a line branching from first fluid line 21 to the draw side of FO-unit 6. Dedicated first PD concentrate pump 57 enables first PD concentrate (e.g., buffer) to be pulled from first PD concentrate container 4a and pushed through FO-unit 6 to diluted PD concentrate container 9 via line 27, while diluting pump 41 pulls diluted first PD concentrate container from diluted PD concentrate container 9 via line 27.

Since time for the FO session is an important decision, it may be desirable to begin the session as soon as possible after the completed drain. The added first PD concentrate pump 57, which may be an accurate pump, e.g., membrane or piston pump, enables the FO session to run in parallel with the mixing session. When no effluent exists, diluting pump 41 delivers diluted first concentrate so as to be added to glucose and possibly purified water to make a desired final PD fluid for delivery to patient P. At the same time, added first PD concentrate pump 57 performs FO.

Recirculation using diluting pump 41 may be performed as described herein, and may be started as soon as a patient fill is completed. In FIG. 7, the diluted first PD concentrate is fed from line 27 to diluted PD concentrate container 9, wherein line 27 does not include concentration or conductivity sensor 8. The reason is to not disturb the concentration of the diluted first PD fluid leaving diluted PD concentrate container 9 via line 18, which passes concentration or conductivity sensor 8 for checking and feedback to control unit 40. Concentration or conductivity sensor 8 could alternatively be moved to line 27 where it is assumed that the diluted concentrate in diluted PD concentrate container 9 is homogenous at start of a fill. New diluted first PD concentrate can then be compared with that of the previous session.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the scope of the appended claims.

The invention claimed is:

1. A system for producing fluid for peritoneal dialysis (PD), the system comprising:
    a fluid path including one or more PD-concentrate connectors each connector configured to be connected to a source of PD concentrate fluid, an inlet connector configured to be connected to a fluid line arranged for transportation of effluent fluid from a patient;

a forward osmosis (FO)-unit including a draw side and a feed side separated by a FO-membrane, the FO-unit fluidly connected to the fluid path, wherein the FO-unit is configured to receive one or more PD concentrate fluids at the draw side and to receive the effluent at the feed side, wherein water is transported from the effluent to the one or more PD concentrate fluids through the FO-membrane via an osmotic pressure gradient between the draw side and the feed side, thereby diluting the one or more PD concentrate fluids into a diluted PD concentrate fluid, wherein the fluid path includes a circulation fluid path for circulating the diluted PD concentrate fluid;

a concentration sensor configured to sense the concentration of the diluted PD concentrate fluid; and a control arrangement configured to control a flow rate of effluent fluid into the feed side, and control a flow rate of the one or more PD concentrate fluids into the draw side based on a desired composition of a final PD fluid, a concentration of the one or more PD concentrate fluids, an amount of effluent at hand, and a time available for an FO session to yield the diluted PD concentrate fluid, circulate the diluted PD concentrate fluid in the circulation fluid path until a mixing criterion for the diluted PD concentrate fluid is fulfilled based on the sensed concentration by the concentration sensor, and control a flow rate of a second or third concentrate into the diluted PD concentrate fluid to form the final PD fluid.

2. The system according to claim 1, wherein the control arrangement is configured to perform (i) the control of the flow rate of effluent fluid into the feed side, and (ii) the control of the flow rate of the one or more PD concentrate fluids to yield the diluted PD concentrate fluid prior to treatment.

3. The system according to claim 1, wherein the control arrangement includes a first pump configured to pump the one or more PD concentrate fluids into the draw side.

4. The system according to claim 1, wherein the control arrangement is configured such that transportation of effluent fluid from a patient for storage is performed prior to treatment.

5. The system according to claim 3, including a second pump configured to pump the second or third concentrate, which may include an osmotic agent.

6. The system according to claim 1, wherein the fluid path includes a water source connector downstream of the FO-unit, the water source connector configured to be connected to a source of purified water, and wherein the control arrangement is configured to cause purified water from the source of purified water to be supplied to the diluted PD concentrate fluid to achieve a prescribed composition of the final PD fluid.

7. The system according to claim 6, which is configured to sense a concentration of the final PD fluid, wherein the control arrangement is configured to control the flow rate of the diluted one or more PD concentrate fluids and the second or third concentrate to achieve the prescribed composition of the final PD fluid based on the sensed concentration of the final PD fluid.

8. The system according to claim 1, further including a system pump configured to pump a flow rate of the final PD fluid.

9. The system according to claim 1, further including a diluted PD concentrate container fluidly connected or connectable to the fluid path, wherein the diluted PD concentrate container is arranged to receive the diluted PD concentrate fluid, and wherein the diluted PD concentrate container is optionally initially partially filled with purified water.

10. The system according to claim 1, further including an effluent pump configured to pump the flow rate of effluent fluid into the feed side.

11. The system according to claim 1, further including a heater configured to heat the fluid in the fluid path.

12. The system according to claim 1, further including an effluent container fluidly connected to the fluid path and the inlet connector, wherein the effluent container is arranged to collect effluent fluid received from the patient before it is transported into the feed side.

13. The system according to claim 1, wherein the one or more PD concentrate fluids includes a fluid including one or more of lactate, acetate, citrate, bicarbonate, NaCl, MgCl2, CaCl2, or KCl.

14. The system according to claim 1, wherein one of the PD concentrate fluids includes a higher concentrated component solution than the component solution in a fully mixed version of the PD concentrate, and the other of the PD concentrate fluids includes a remainder of the concentrate.

15. The system according to claim 1, which is a continuous flow peritoneal dialysis (CFPD) system, and which further includes a drain pump positioned and arranged to pump effluent from a patient to a location for delivery to the feed side of the FO-unit.

16. The system according to claim 9, wherein the control arrangement includes the first pump configured to pump diluted one or more PD concentrate fluids from the diluted PD concentrate container and a second PD concentrate pump configured to pump the one or more PD concentrate fluids into the draw side of the FO-unit.

17. The system according to claim 1, which further includes a line and a valve positioned and arranged to enable initially but not completely diluted PD concentrate fluid to be redirected for delivery to the feed side of the FO-unit.

18. The system according to claim 1, which further includes a device configured and arranged to create a higher pressure on the feed side of the FO-unit than the draw side.

19. A method for producing fluid for peritoneal dialysis (PD) in a system including a forward osmosis-(FO-) unit including a draw side and a feed side separated by a FO-membrane, the FO-unit configured to receive one or more PD concentrate fluids at the draw side and effluent fluid from a PD patient at the feed side to transport water from the effluent to the one or more PD concentrate fluids through the FO-membrane by means of an osmotic pressure gradient between the draw side and the feed side, and thereby diluting the one or more PD concentrate fluids into a diluted PD concentrate fluid, the method including:

controlling a flow rate of the effluent fluid into the feed side of the FO-unit;

controlling a flow rate of the one or more PD concentrate fluids into the draw side based on a desired composition of a final PD fluid, a concentration of the one or more concentrate fluids, an amount of effluent at hand and a time available for an FO session to yield the diluted PD concentrate fluid;

sensing a concentration of the diluted PD concentrate fluid;

circulating the diluted PD concentrate fluid in the circulation fluid path until a mixing criterion for the diluted PD concentrate fluid is fulfilled based on the sensed concentration of the diluted PD concentrate fluid; and controlling a flow rate of a second or third concentrate into the diluted PD concentrate fluid to form a final PD fluid.

20. The method according to claim 19, wherein the flow rate of the effluent and the flow rate of the one or more PD concentrate fluids is performed prior to treatment and the flow rate of the second or third concentrate is performed during treatment.

* * * * *